(12) United States Patent
Satoh et al.

(10) Patent No.: US 6,480,636 B1
(45) Date of Patent: Nov. 12, 2002

(54) OPTICAL ISOLATOR COMPRISING A FARADAY ROTATOR

(75) Inventors: Tadakuni Satoh, Sendai (JP); Masayuki Kimura, Shiroishi (JP); Takahiro Nakajima, Sendai (JP)

(73) Assignee: Tokin Corporation, Miyagi (JP)

( * ) Notice: Subject to any disclaimer, the term of this patent is extended or adjusted under 35 U.S.C. 154(b) by 0 days.

(21) Appl. No.: 09/646,854

(22) PCT Filed: Jan. 28, 2000

(86) PCT No.: PCT/JP00/00477
§ 371 (c)(1),
(2), (4) Date: Sep. 22, 2000

(87) PCT Pub. No.: WO00/45214
PCT Pub. Date: Aug. 3, 2000

(30) Foreign Application Priority Data

Jan. 29, 1999 (JP) .......................... 11-022575
Apr. 16, 1999 (JP) .......................... 11-109623
Jun. 11, 1999 (JP) .......................... 11-165252
Jul. 27, 1999 (JP) .......................... 11-212362
Jul. 30, 1999 (JP) .......................... 11-217255

(51) Int. Cl.$^7$ ................................. G02B 6/00
(52) U.S. Cl. ....................... 385/11; 385/6; 359/484
(58) Field of Search ........................ 385/11, 6, 31, 385/33, 27, 34; 359/40, 484, 283, 281; 372/703

(56) References Cited

U.S. PATENT DOCUMENTS 5,402,260 A  3/1995  Tsuneda et al. ............. 359/282
5,627,924 A  5/1997  Jin et al. ..................... 385/16
6,288,827 B1 * 9/2001 Kawai et al. ................ 359/283

FOREIGN PATENT DOCUMENTS

EP    0 381 117 A    8/1990

OTHER PUBLICATIONS

Patent Abstracts of Japan, vol. 016, No. 559, Nov. 30, 1992, of JP 04 212924 A, Aug. 4, 1992.
Patent Abstracts of Japan, vol. 016, No. 442, Sep. 16, 1992, of JP 04 153619 A, May 27, 1992.
Patent Abstracts of Japan, vol. 1997, No. 04, Apr. 30, 1997 of JP 08 327950 A, Dec. 13, 1996.
S. Makio et al, "Optical Isolators for Optical Communication Systems", *Electronics and Communications in Japan, Part II—Electronics*, vol. 74, No. 2, pp. 50–59, Feb. 1, 1991.

* cited by examiner

*Primary Examiner*—Phan T. H. Palmer
(74) *Attorney, Agent, or Firm*—Frishauf, Holtz, Goodman & Chick, P.C.

(57) ABSTRACT

An optical isolator comprises an optical element assembly (10) including a Faraday rotator (1) and a pair of polarizing elements (2) one of which is arranged on a light-input side of the Faraday rotator (1) to serve as a polarizer and other of which is arranged on a light-output side to serve as an analyzer. The optical element assembly (10) is received at the center of an inner bore or a cavity of a cylindrical iron-chromium-cobalt (Fe—Cr—Co) magnet (5). The Faraday rotator (1) comprises a magnetic garnet thick film which is a Bi garnet thick film remarkably low in saturation magnetization as compared with a rare-earth garnet. The Fe—Cr—Co magnet (5) serves as a field-application magnet for generating a magnetic field applied to magnetize the Bi garnet thick film and also as an isolator casing because it is excellent in magnetic and mechanical characteristics.

18 Claims, 15 Drawing Sheets

OPTICAL ISOLATOR COMPRISING A FARADAY ROTATOR

TECHNICAL FIELD

This invention relates to an optical isolator used in an optical system for preventing a light beam emitted from a light source in the optical system from returning to the light source after reflected by an end face of any one of optical elements in the optical system.

BACKGROUND ART

Generally, during propagating in an optical system, a light beam emitted from a light source is reflected at an end face of any one of optical elements in the optical system and returns to the light source. For example, in an optical communication system, a laser beam emitted from a laser as a light source is converged by a coupling lens to an end face of an optical fiber. In this event, most of the laser beam enters the optical fiber and propagates therethrough. On the other hand, a part of the laser beam is reflected at the end face of the optical fiber and returns to the laser as a return beam. Generally, the return beam is different in phase and polarizing direction from the laser beam produced in the laser. Therefore, the return beam may often disturb the oscillation of the laser to produce a noise in the laser beam, and, in the worst case, to stop the laser oscillation.

In order to avoid the noise in the laser beam, the return beam must be isolated. To this end, an optical isolator is used. An optical circulator also has a function similar to that of the optical isolator. Basically, the optical isolator is required to be high in isolation characteristic or quenching ratio of the return beam and to be suppressed in transmission loss or insertion loss of an incident light beam.

An existing optical isolator comprises a Faraday rotator of, typically, a thick film of magnetic garnet and a pair of polarizing elements arranged on both sides of the Faraday rotator. Specifically, one of the polarizing elements is arranged at a light-input side of the Faraday rotator and serves as a polarizer while the other polarizing element is arranged at a light-output side and serves as an analyzer. Around the Faraday rotator, a cylindrical permanent magnet such as a rare-earth magnet is disposed and serves as a field-application magnet which generates a magnetic field for magnetizing the magnetic garnet thick film of the Faraday rotator in one direction. An isolator casing made of stainless steel surrounds the permanent magnet. Typically, the above-mentioned optical elements and the permanent magnet are fixed to the isolator casing through a holder by bonding using adhesive, solder, laser welding, or the like.

Most of commercially available magnetic garnet thick films for use as a magnetic material of the Faraday rotator is high in saturation magnetization. Since the field-application magnet is required to have a magnetic field strength sufficient to fully magnetize the magnetic garnet thick film as the Faraday rotator in the one direction, the rare-earth magnet such as a samarium-cobalt (Sm—Co) magnet having a high in performance is usually used as the field-application permanent magnet. Since the rare-earth permanent magnet is expensive, the use of the rare-earth magnet for the field-application magnet inevitably increases the cost of the optical isolator as a whole.

As described above, the existing optical isolator incldues the permanent magnet as the field-application magnet, the holder and the isolator housing which occupy a relatively large space, the optical isolator as a whole is difficult to be reduced in size.

The holder used as the mounting structure of the optical isolator holds the permanent magnet and covers the optical elements for the purpose of reinforcement and protection of the optical elements from external shock. In case where the optical isolator is connected to an optical fiber, another holder having a sleeve is also used for mounting the optical isolator at an end of a ferrule for holding an optical fiber.

In assembling the existing optical isolator which has a plurality of the optical elements, the field-application magnet, the holder and the isolator casing are arranged, much time and labor are required. Therefore, a production cost inevitably becomes high.

Furthermore, in case where the Sm—Co magnet, which is a typical rare-earth magnet, is used as the field-application permanent magnet, the Sm—Co permanent magnet is required to have a sufficient thickness. This is because the Sm—Co magnet is hard and brittle and is therefore difficult in machining. In addition, the holder is required to support the permanent magnet. Therefore, an outer diameter of the optical isolator as a whole becomes relatively large. In this event, the optical isolator can not be assembled in the sleeve holder to be mounted to the ferrule of a small diameter in case where the optical isolator is connected to the optical fiber.

In addition, the optical isolator is often desired to be used in an optical waveguide, an optical device, an optical module, or an optical system. In that case, it is also required for reduction in size and cost. However, the existing optical isolator of the above-mentioned structure is difficult in reduction in size and cost.

DISCLOSURE OF THE INVENTION

It is a primary object of this invention to provide an optical isolator which comprises a high-performance low-cost magnet as a field-application magnet for applying a magnetic field to a Faraday rotator and which can be reduced in size and cost of the optical isolator as a whole.

It is another object of this invention to provide an optical isolator which is easy in assembling and which can readily and effectively be incorporated into an optical component, an optical waveguide, an optical device, an optical module, or an optical system.

According to this invention, there is provided an optical isolator which includes a Faraday rotator of a magnetic garnet thick film and a field-application magnet for generating a magnetic field applied to magnetize the magnetic garnet thick film, wherein the field-application magnet is a selected one of an iron-chromium-cobalt (Fe—Cr—Co) magnet, a Cunife magnet made of a copper-nickel-iron (Cu—Ni—Fe) alloy, a platinum (Pt) alloy magnet made of a Pt—Co alloy or a Pt—Fe alloy, and Cunico magnet made of a copper-nickel-cobalt (Cu—Ni—Co) alloy.

In the optical isolator mentioned above, one of the Fe—Cr—Co magnet, the Cunife magnet, the Pt alloy magnet, and the Cunico magnet is used as an isolator casing.

In the optical isolator mentioned above, the selected one of the Fe—Cr—Co magnet, the Cunife magnet, the Pt alloy magnet, and the Cunico magnet has a cylindrical shape, a rectangular-frame shape, or a U-frame shape.

In the optical isolator mentioned above, the field application magnet is made of the Fe—Cr—Co magnet having a dimension such that the relationship $t \cdot (S)^{-1/2} \geq 0.7$ is satisfied where t represents the length of the magnet in the magnetizing direction and S represents a sectional area of the magnet in a plane perpendicular to a magnetizing direction thereof.

In the optical isolator mentioned above, the field-application magnet is made of one of the Cunife magnet, the Pt alloy magnet, and the Cunico magnet which has a dimension such that the relationship $t \cdot (S)^{-1/2} \geq 0.4$ is satisfied.

In the optical isolator mentioned above, the magnetic garnet thick film is a Bi garnet thick film which is formed by at least one of a GdBi garnet film and a TbBi garnet film prepared by liquid-phase epitaxial growth.

In the optical isolator mentioned above, the field-application magnet which is one of the Fe—Cr—Co magnet, the Cunife magnet, the Pt alloy magnet, and the Cunico magnet satisfies the relationship $Hm/4\pi Ms \geq 0.7$ where Hm (Oe) represents the maximum magnetic field generated in a cavity of said magnet and $4\pi Ms$ (G) represents the saturation magnetization for the Bi garnet thick film.

In the optical isolator mentioned above, an isolator casing is made of one of the Fe—Cr—Co magnet, the Cunife magnet, the Pt alloy magnet, and the Cunico magnet and is used as a holder for holding a plurality of optical elements including the Faraday rotator and a pair of polarizing elements. The optical elements are fixed by an organic adhesive or a solder to the holder in an inclined position such that a light beam is incident to optical element surfaces of the optical elements at an inclination angle not greater than 10°. Preferably, the holder formed by the isolator casing has a sleeve integrally formed therewith to connect a ferrule for holding an optical fiber.

According to this invention, there is also provided an optical waveguide, an optical device, an optical module, an optical system, or an optical component which has an optical isolator described in any one of the foregoing paragraphs. In a case, the optical isolator preferably has a sleeve integrally formed therewith which is attached to an end of a ferrule for holding an optical fiber.

BEST MODE FOR CARRYING OUT THE INVENTION

In order to facilitate an understanding of this invention, description will at first be made about an existing optical isolator.

Figure 1:
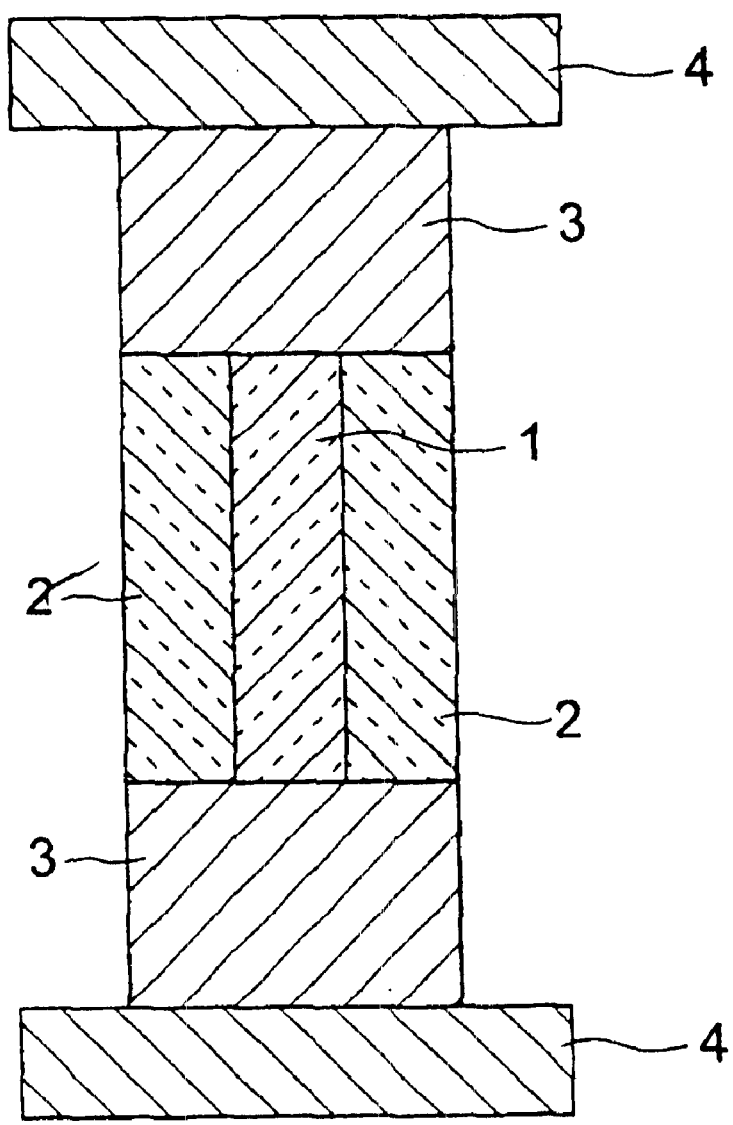
FIG. 1 is a side sectional view of an existing optical isolator.

Referring to FIG. 1, the existing optical isolator includes a plurality of optical elements, i.e., a Faraday rotator 1 of a magnetic garnet thick film and a pair of polarizing elements 2 arranged on both sides of the Faraday rotator 1. Specifically, one of the polarizing elements 2 is arranged at a light-input side and serves as a polarizer while the other polarizing element 2 is arranged at a light-output side and serves as an analyzer. Around the Faraday rotator 1, a cylindrical permanent magnet 3 such as a rare-earth magnet, typically, a Sm—Co magnet is disposed and serves as a field-application magnet to generate a magnetic field for magnetizing the magnetic garnet thick film of the Faraday rotator 1 in one direction. The permanent magnet 3 is surrounded by an isolator casing 4 made of stainless steel. Typically, the above-mentioned optical elements and the permanent magnet 3 are fixed to the isolator casing 4 through a holder (not shown) by bonding using an adhesive, solder, laser welding, or the like.

Figure 2:
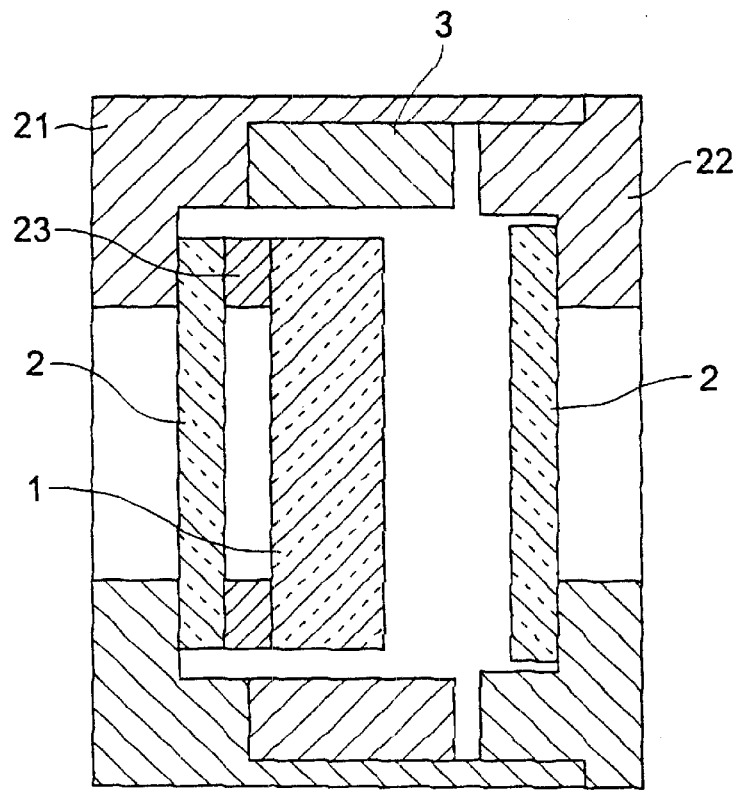
FIG. 2 is a side sectional view showing a mounting structure of the existing optical isolator.

Referring to FIG. 2, the existing optical isolator has a mounting structure comprising an external holder 21 of a generally cylindrical shape and an end holder 22 of a generally cylindrical shape. The external holder 21 has an outer recessed portion formed at a radially outer position and an inner recessed portion formed at a radially inner position. In the external holder 21, the permanent magnet 3 is fitted to the outer recessed portion while one of the polarizing elements 2 and the Faraday rotator 1 with a metal ring 23 interposed therebetween as a coupling member are attached to the inner recessed portion. The other polarizing element 2 is attached to an inner recessed portion of the end holder 22. The external holder 21 and the end holder 22 are coupled to each other.

Figure 3:
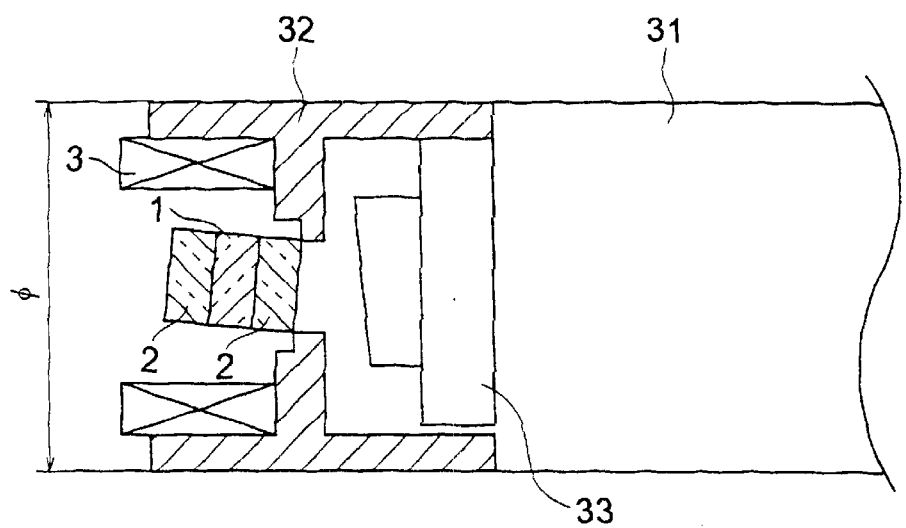
FIG. 3 is a side sectional view showing the existing optical isolator incorporated into an optical component and held by a sleeve holder.

Referring to FIG. 3, when the existing optical isolator is connected to an optical fiber, a sleeve holder 32 is used which is attached to an end of a narrow ferrule 31 for holding the optical fiber 33. The sleeve holder 32 has an outer recessed portion with the permanent magnet 3 fitted thereto and an inner recessed portion in which the two polarizing elements 2 and the Faraday rotator 1 interposed therebetween are arranged in an inclined position. Specifically, the optical elements including the Faraday rotator 1 and the polarizing elements 2 are arranged so that their surfaces are inclined with respect to a plane perpendicular to an optical axis of the optical isolator. In an opening of the sleeve holder 32 on the side opposite to the optical elements, a core portion of the optical fiber 33 held by the ferrule 31 is arranged to face the optical elements.

However, the existing optical isolator has problems as described in the preamble. Specifically, If Sm—Co magnet is used for the field-application permanent magnet 3, it is required to have a sufficient thickness, as described hereinbefore. Specifically, the minimum thickness is limited to about 0.5 mm. In addition, the sleeve holder 32 for holding the permanent magnet 3 is required. Therefore, the outer diameter φ (herein, the diameter of the sleeve holder 32) must be relatively large. Specifically, the outer diameter φ is limited to about 3 mm at minimum. Practically, the optical isolator of such a relatively large size can not be arranged in the sleeve holder 32 attached to the narrow ferrule 31 for holding the optical fiber.

Now, description will be made about a number of preferred embodiments of this invention with reference to the drawing.

At first, general description of an optical isolator of this invention will be made. The optical isolator includes a Faraday rotator of a magnetic garnet thick film, a pair of polarizing elements, and a field-application magnet for generating a magnetic field applied to magnetize the magnetic garnet thick film. The Faraday rotator and the polarizing elements may collectively called optical elements. Herein, the magnetic garnet thick film is a Bi garnet thick film. The field-application magnet is made of a selected one of an iron-chromium-cobalt (Fe—Cr—Co) magnet, a Cunife magnet made of a copper-nickel-iron (Cu—Ni—Fe) alloy, a platinum (Pt) alloy magnet made of a Pt—Co alloy or a Pt—Fe alloy, and a Cunico magnet made of a copper-nickel-cobalt (Cu—Ni—Co) alloy.

The Bi garnet thick film is made of at least one of a GdBi garnet film and a TbBi garnet film grown on a garnet growing substrate by liquid-phase epitaxial growth (LPE) with a part of Fe replaced by Al and Ga. Such Bi garnet thick film has an easy magnetization axis in a thickness direction and is easily saturated in magnetization under a relatively low magnetic field. Furthermore, GdBi garnet and TbBi garnet are remarkably low in saturation magnetization as compared with other species of rare-earth garnet. By replacing a part of Fe with Al and Ga, the saturation magnetization can be lowered further. Specifically, the saturation magnetization $4\pi Ms$ (G)$\leq 500$ (G) can readily be achieved.

With the above-mentioned structure, the magnetic field applied to saturate the magnetization of the Faraday rotator can be lowered in strength so that the magnetic characteristics of the field-application magnet can be degraded. This enables reduction in cost. Thus, since the saturation magnetization $4\pi Ms$ (G) of the Bi garnet thick film as the Faraday rotator is not greater than 500 (G), it is possible to obtain the magnetic field required to magnetize the Bi garnet thick film by the use of an inexpensive magnet selected from the Fe—Cr—Co magnet, the Cunife magnet, the Pt alloy magnet, and the Cunico magnet without substantially increasing the volume and without using an expensive rare-earth magnet.

Each of the Fe—Cr—Co magnet, the Cunife magnet, the Pt alloy magnet, and the Cunico magnet is easy in working such as deforming and machining, excellent in anticorrosion (similar to stainless steel), and easy in plating, soldering, and welding. As regards the magnetic characteristics, the coercive force (Hc) is slightly low but the residual magnetization (Br) is high. By heat treatment in the magnetic field, magnetic anisotropy is easily added so that the performance can readily be improved. Therefore, the field-application magnet which is thin and excellent in anticorrosion and soldering can be easily produced by rolling, drawing, welding, machining, or the like. Since the performance is similar to that of the stainless steel, the field-application magnet can be used as an isolator casing.

With the above-mentioned structure, it is possible to reduce the diameter, the number of parts, and the number of production steps upon assembling the optical isolator. As a whole, reduction in size and cost can be reduced.

If each of the Fe—Cr—Co magnet, the Cunife magnet, the Pt alloy magnet, and the Cunico magnet is formed into a rectangular-frame shape or a U-frame shape, automatic mounting is extremely easy as a surface mounting component. In particular, in case of the U-frame shape, the optical elements can be easily attached to a cavity of the magnet. Each of these magnets is easy shaped by deforming and madhining and can be welded. Therefore, a desired shape can readily be achieved by extrusion molding, bending of a flat material, or welding. In this connection, the shape may preferably be cylindrical.

If the Fe—Cr—Co magnet is selected as the field-application magnet, the dimension of the magnet preferably satisfies the relationship $t \cdot (S)^{-\frac{1}{2}} \geq 0.7$ where S represents a sectional area (bottom surface area) of the magnet in a plane perpendicular to a magnetizing direction and t represents the length (depth or thickness) of the magnet in the magnetizing direction. Practically, $t \cdot (S)^{-\frac{1}{2}}$ has an upper limit around 10. If $t \cdot (S)^{-\frac{1}{2}}$ is smaller than 0.7, the isolation of the optical isolator is considerably deteriorated. On the other hand, if $t \cdot (S)^{-\frac{1}{2}}$ is not smaller than 0.7, the strength and the uniformity of the magnetic field generated by the Fe—Cr—Co magnet are excellent so that the isolation becomes high.

Similarly, in case where one of the Cunife magnet, the Pt alloy magnet, and the Cunico magnet is selected as the field-application magnet, the relationship $t \cdot (S)^{-\frac{1}{2}} \geq 0.4$ is preferably satisfied where S represents a sectional area (bottom surface area) of the magnet in a plane perpendicular to the magnetizing direction and t represents the length (depth or thickness) of the magnet in the magnetizing direction. Practically, $t \cdot (S)^{-\frac{1}{2}}$ has an upper limit around 10. If $t \cdot (S)^{-\frac{1}{2}}$ is smaller than 0.4, the isolation of the optical isolator is considerably deteriorated. On the other hand, if $t \cdot (S)^{-\frac{1}{2}}$ is not smaller than 0.4, the strength and the uniformity of the magnetic field generated by the magnet are excellent so that the isolation becomes high.

In case where one of the Fe—Cr—Co magnet, the Cunife magnet, the Pt alloy magnet, and the Cunico magnet is selected as the field-application magnet, the relationship $Hm/4\pi Ms \geq 0.7$ is preferably satisfied where Hm (Oe) represents a maximum magnetic field generated in a cavity of the magnet and $4\pi Ms$ (G) represents the saturation magnetization for the Bi garnet thick film. If $Hm/4\pi Ms$ is smaller than 0.7, the isolation of the optical isolator is considerably deteriorated. On the other hand, if $Hm/4\pi Ms$ is not smaller than 0.7, the alignment of the magnetic moment of the Bi garnet thick film is improved so that the isolation becomes high.

Specifically, each of the Fe—Cr—Co magnet, the Cunife magnet, the Pt alloy magnet, and the Cunico magnet used as the field-application magnet in this invention has a high hardness but is easy in machining as compared with the Sm—Co magnet. Therefore, the thickness of the permanent magnet as the field-application magnet can be reduced to about 0.2 mm and the holder for protection against external shock can be omitted. As a consequence, the optical isolator using one of the Fe—Cr—Co magnet, the Cunife magnet, the Pt alloy magnet, and the Cunico magnet can be smaller in outer diameter ($\phi$) than the existing optical isolator by about 1 mm or more. In case where the optical isolator of this invention is applied to an optical component, the optical isolator can properly be arranged in a sleeve holder attached to a narrow ferrule for holding an optical fiber.

Each of the Fe—Cr—Co magnet, the Cunife magnet, the Pt alloy magnet, and the Cunico magnet is relatively low in coercive force (Hc). Therefore, in order to obtain a magnetic field sufficient to operate the Faraday rotator, it is necessary to satisfy the relationship $L/D \geq 1.5$ where L and D represent the length and the outer diameter of the magnet, respectively. Furthermore, in order to obtain a stable saturation magnetic field independent of an ambient environment, the relationship $L/D \geq 2.0$ must be satisfied.

The isolator casing comprising one of the Fe—Cr—Co magnet, the Cunife magnet, the Pt alloy magnet, and the Cunico magnet may be used as a holder for holding the optical elements including the Faraday rotator and the polarizing elements. The optical elements are fixed to the holder by an organic adhesive or a solder in an inclined position such that a light beam is incident to their surfaces at an inclination angle of 10° or less. The optical isolator of the above-mentioned structure is stable in optical characteristics and high in reliability.

The above-described optical isolator of this invention can readily and effectively be applied to an optical waveguide, an optical device, an optical module, an optical system, or an optical component. In particular, if it is applied to the optical component and the isolator casing comprising one of the Fe—Cr—Co magnet, the Cunife magnet, the Pt alloy magnet, and the Cunico magnet is used as the holder, the light beam passing through the optical isolator can efficiently be coupled to the optical fiber by integrally forming a sleeve to connect the ferrule for holding the optical fiber. By attaching the optical isolator of a small size to the end of the narrow ferrule, the optical fiber with an optical isolator function is obtained as a useful optical component.

Hereinafter, the optical isolator of this invention and the production process will be described in detail in conjunction with several specific embodiments.

1st Embodiment

An optical isolator according to a first embodiment of this invention was produced in the following manner. At first, high-purity powdery materials of gadolinium oxide ($Gd_2O_3$), terbium oxide ($Tb_2O_3$), ferrous oxide ($Fe_2O_3$), gallium oxide ($Ga_2O_3$), aluminum oxide ($Al_2O_3$), bismuth oxide ($Bi_2O_3$), lead oxide (PbO), and boron oxide ($B_2O_3$) were prepared. By LPE using a PbO—$Bi_2O_3$—$B_2O_3$ flux, a GdBi garnet film having a main composition represented by $Gd_{1.9}Bi_{1.1}Fe_{4.3}Al_{0.4}Ga_{0.3}O_{12}$ was grown to the thickness of about 600 $\mu$m on an NGG substrate having a grating constant of 12.5094 angstroms. Likewise, a TbBi garnet film having a main composition represented by $Tb_{2.0}Bi_{1.0}Fe_{4.1}Al_{0.4}Ga_{0.5}O_{12}$ was grown to the thickness of about 600 g m on an SGGG substrate having a grating constant of 12.496 angstroms. Each of the GdBi garnet film and the TbBi garnet film contains a small amount of $B_2O_3$ and PbO (each being 3 wt % or less).

Next, after removing the NGG substrate and the SGGG substrate, the GdBi garnet film and the TbBi garnet film were heat-treated at 1050° C. in a 50% oxygen atmosphere. These garnet films were measured for magnetic characteristics by the use of a vibratory-type magnetometer. Each film had a saturation magnetization $4\pi Ms$ between 100 and 150 G and exhibited easy magnetization in the thickness direction. The Faraday rotation of each garnet film was about 1000 deg/cm at the wavelength of 1.55 $\mu$m.

Then, the film thickness of each garnet film was adjusted to about 450 $\mu$m so that the Faraday rotation angle is approximately equal to 45° at the wavelength of 1.55 $\mu$m. These garnet films were subjected to so called AR coating treatment, bonded to each other, and thereafter cut to produce a Faraday rotator 1 of a flat quadrilateral shape of 1 mm square.

Figure 4:
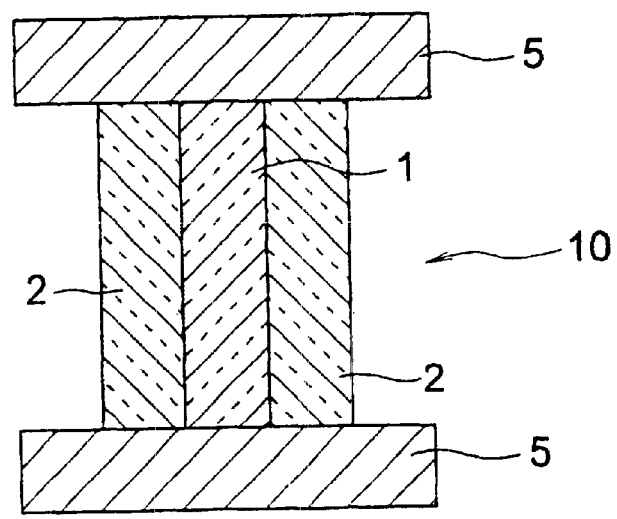
FIG. 4 is a side sectional view of an optical isolator according to a first embodiment of this invention.

Referring to FIG. 4, a pair of polarizing elements 2 each of which comprises a quadrilateral flat glass of 1 mm square were coupled to the Faraday rotator 1 so that they have planes of polarizaion of 45°. Specifically, one of the polarizing elements 2 was arranged on a light-input side to serve as a polarizer while the other polarizing element 2 was arranged on a light-output side to serve as an analyzer. The Faraday rotator 1 and the polarizing elements 2 may collectively be called optical elements. Thus, an optical element assembly 10 comprising a combination of the optical elements was obtained. The optical element assembly 10 was received at the center of an inner bore or a cavity of an iron-chromium-cobalt (Fe—Cr—Co) magnet 5 having a cylindrical shape and serving as both of a field-application magnet and an isolator casing. The Fe—Cr—Co magnet 5 had an outer diameter of 2 mm, an inner diameter of 1.5 mm, and a depth (thickness) of 2.5 mm. Thereafter, by the use of an electromagnet, a magnetic field of about 3 kOe was applied to magnetize the Fe—Cr—Co magnet 5 in a depth direction. Thus, the optical isolator of the first embodiment was obtained.

Herein, the Fe—Cr—Co magnet (MCC44/5) 5 had a magnetic anisotropy in the depth direction, i.e., the magnetizing direction. As regards magnetic properties of the magnet, the residual magnetization Br was approximately equal to 10000 (G) and the coercive force $H_c$ was approximately equal to 700 (Oe).

The optical isolator of the first embodiment was measured for the isolator characteristics at the wavelength of 1.55 $\mu$m. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

2nd Embodiment

Figure 5:
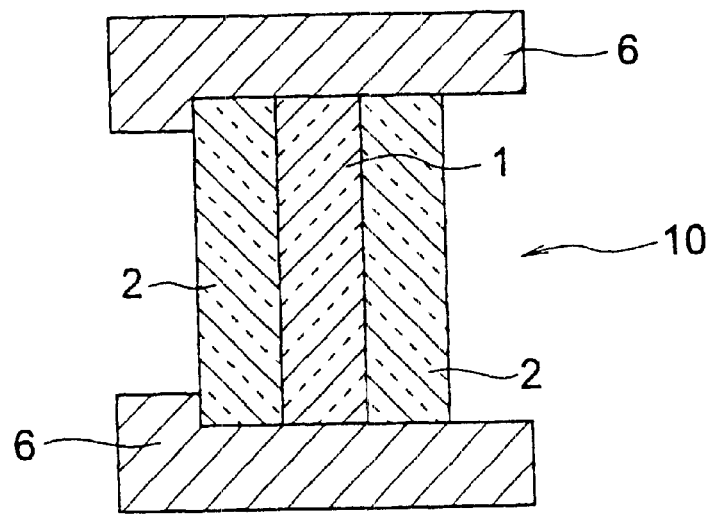
FIG. 5 is a side sectional view of an optical isolator according to a second embodiment of this invention.

An optical isolator according to a second embodiment was produced as follows. At first, the optical element assembly 10 was obtained in the manner similar to the first embodiment. Thereafter, the optical element assembly 10 was received in an inner bore or a cavity of an iron-chromium-cobalt (Fe—Cr—Co) magnet 6 having a cylindrical shape and serving as a field-application magnet and an isolator casing. Referring to FIG. 5, the inner bore of the Fe—Cr—Co magnet 6 was slightly narrower (about 0.3 mm) at its one end than the remaining portion so that the optical element assembly 10 was easily positioned at the center of the inner bore. Thus, the optical isolator of the second embodiment was obtained.

Herein, the Fe—Cr—Co magnet (MCC14/4) 6 had a magnetic anisotropy in the height direction. As regards magnet characteristics, the residual magnetization Br was approximately equal to 8000 (G) and the coercive force Hc was approximately equal to 500 (Oe).

The optical isolator of the second embodiment was measured for the isolator characteristics at the wavelength of 1.55 μm in the manner similar to the first embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

3rd Embodiment

Figure 6:
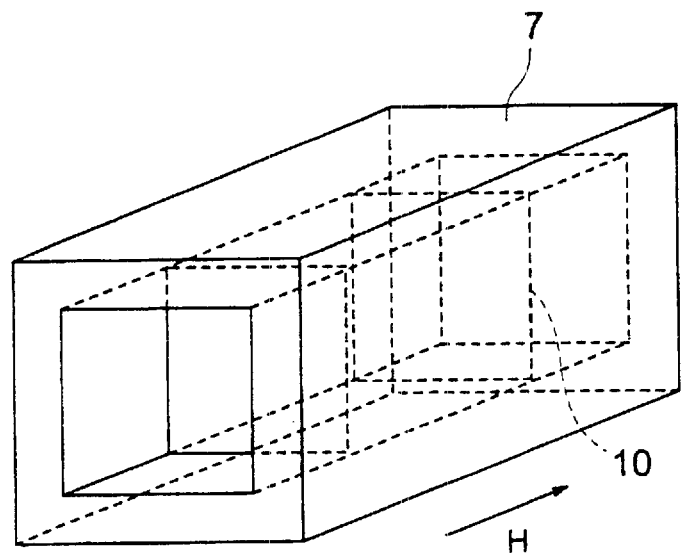
FIG. 6 is a perspective view of an optical isolator according to a third embodiment of this invention.

An optical isolator according to a third embodiment was produced as follows. At first, the optical element assembly 10 was obtained in the manner similar to the first embodiment. Thereafter, as illustrated in FIG. 6, the optical element assembly 10 was received at the center of a cavity of an iron-chromium-cobalt (Fe—Cr—Co) magnet 7 having a rectangular-frame shape and serving as a field-application magnet and an isolator casing. The Fe—Cr—Co magnet 7 had an outer dimension of 1.5 mm (height)×1.5 mm (width)×2.5 mm (length) which has the cavity having a dimension of 1 mm (height)×1 mm (width)×2.5 mm (length). Thus, the optical isolator of the third embodiment was obtained.

Herein, the Fe—Cr—Co magnet (MCC44/5) 7 had a magnetic anisotropy in the length direction, i.e., the magnetizing direction H of the Fe—Cr—Co magnet 7.

The optical isolator of the third embodiment was measured for the isolator characteristics at the wavelength of 1.55 μm in the manner similar to the first embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

4th Embodiment

Figure 7:
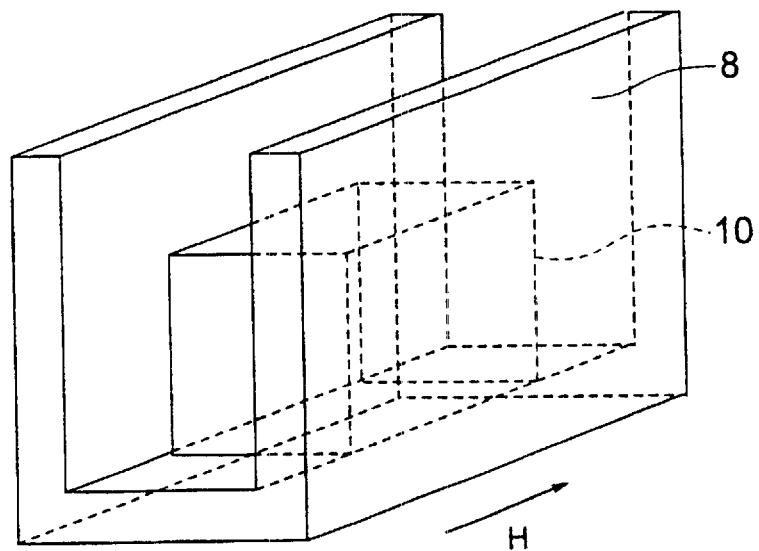
FIG. 7 is a perspective view of an optical isolator according to a fourth embodiment of this invention.

An optical isolator according to a fourth embodiment was produced as follows. At first, the optical element assembly 10 was obtained in the manner similar to the first embodiment. Thereafter, as illustrated in FIG. 7, the optical element assembly 10 was received at the center of a groove in an iron-chromium-cobalt (Fe—Cr—Co) magnet 8 having a U-frame shape and serving as both of a field-application magnet and an isolator casing. The Fe—Cr—Co magnet 8 had an outer dimension of 2.0 mm (height)×1.5 mm (width)×3.0 mm (length) and has the groove having an inner dimension of 1.8 mm (height)×1.0 mm (width)×3.0 mm (length). Thus, the optical isolator of the fourth embodiment was obtained.

Herein, the Fe—Cr—Co magnet (MCC44/5) 8 had a magnetic anisotropy in the depth direction or the thickness direction, i.e., the magnetizing direction H of the Fe—Cr—Co magnet 8.

The optical isolator of the fourth embodiment was measured for the isolator characteristics at the wavelength of 1.55 μm in the manner similar to the first embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

5th Embodiment

Figure 8:
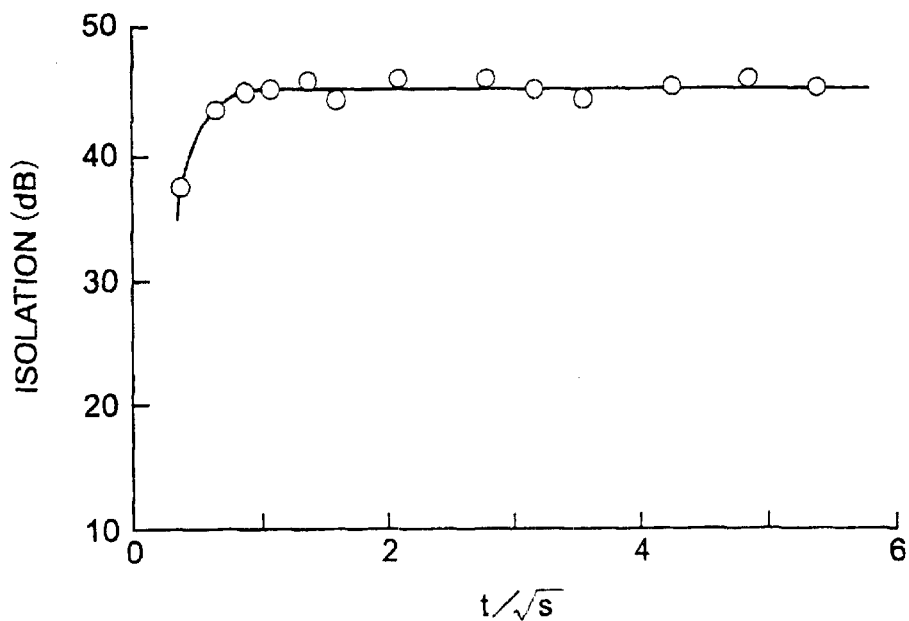
FIG. 8 is a graph showing an isolation characteristic of an optical isolator according to a fifth embodiment of this invention.

As a fifth embodiment, examination was made about the relationship between the isolation and the dimension of a magnet serving as both of a field-application magnet and an isolator casing. Preparation was made of a plurality of samples for each of the cylindrical Fe—Cr—Co magnet 5, the rectangular-frame Fe—Cr—Co magnet 7, and the U-frame Fe—Cr—Co magnet 8 used in the first, the third, and the fourth embodiments. Herein, the samples of the cylindrical magnet 5 had outer diameters between 2.0 mm and 4.0 mm, inner diameters between 1.3 mm and 3.0 mm, and lengths between 1.5 mm and 5.0 mm. The samples of the rectangular-frame and the U-frame magnets 7 and 8 had outer dimensions between 1.0 mm and 2.5 mm in height and width, inner dimensions between 0.8 mm and 2.0 mm in height and width, and lengths between 2.0 mm and 4.0 mm. Examination was made about the relationship between the isolation (dB) and the ratio $t \cdot (S)^{-\frac{1}{2}}$ where S represents a sectional area of the magnet in a plane perpendicular to the magnetizing direction H and t represents the length of the magnet in the magnetizing direction H. The results of examination are shown in FIG. 8. Herein, the optical element assembly 10 had an outer dimension between 0.7 mm and 1.5 mm in height and width.

In FIG. 8, the ratio $t \cdot (S)^{-\frac{1}{2}}$ has values of 0.4, 0.7, 0.9, 1.1, 1.4, 1.6, 2.1, 2.8, 3.2, 3.6, 4.3, 4.9, and 5.4 at white circles in the figure. It will be understood that the isolation is remarkably improved when the ratio is equal to 0.7 or more. Therefore, it is effective that the ratio $t \cdot (S)^{-\frac{1}{2}}$ is not smaller than 0.7. Practically, the ratio $t \cdot (S)^{-\frac{1}{2}}$ has an upper limit of about 10.

6th Embodiment

Figure 9:
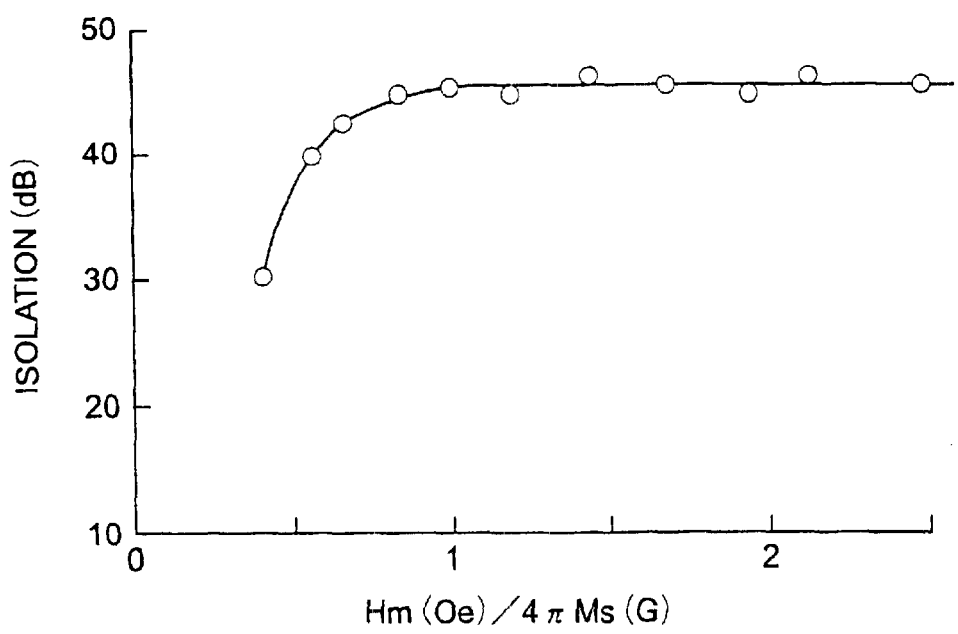
FIG. 9 is a graph showing an isolation characteristic of an optical isolator according to a sixth embodiment of this invention.

As a sixth embodiment, examination was made about the relationship between the isolation and the magnetic characteristics of a field-application magnet and a Faraday rotator. In the sixth embodiment, use was made of samples of the cylindrical Fe—Cr—Co magnet 5, the rectangular-frame Fe—Cr—Co magnet 7, and the U-frame Fe—Cr—Co magnet 8 similar to those used in the fifth embodiment. Specifically, examination was made about the relationship between the isolation (dB) and the ratio $Hm/4\pi Ms$ where $Hm$ (Oe) represents the maximum magnetic field generated in the cavity of the magnet and $4\pi Ms$ (G) represents the saturation magnetization for the Bi garnet thick film used in the Faraday rotator 1 of the optical element assembly 10. The results of examination are shown in FIG. 9. Herein, the GdBi garnet film alone was used as the Bi garnet thick film of the Faraday rotator 1. By changing the melt composition, the saturation magnetization $4\pi Ms$ (G) was adjusted between 30 and 500 (G) and the Faraday rotation at the wavelength of 1.55 μm was adjusted between 800 and 1200 (deg/cm). The ratio $Hm/4\pi Ms$ fell between 0.4 and 2.5.

From FIG. 9, it will be understood that the isolation is drastically improved when the ratio $Hm/4\pi Ms$ becomes equal to 0.7 or more. Therefore, it is effective that the ratio $Hm/4\pi Ms$ is not smaller than 0.7. If the TbBi garnet film or a combination of the GdBi garnet film and the TbBi garnet film is used as the Bi garnet film of the Faraday rotator 1, a substantially similar result can be obtained.

7th Embodiment

Figure 10:
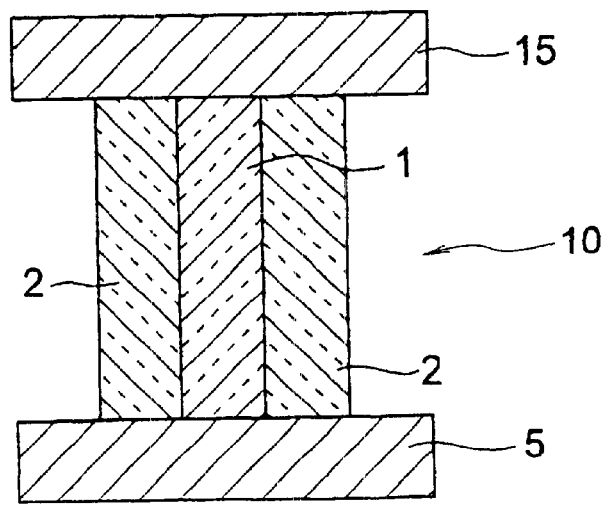
FIG. 10 is a side sectional view of an optical isolator according to a seventh embodiment of this invention.

An optical isolator according to a seventh embodiment was produced as follows. At first, a Faraday rotator 1 of a quadrilateral flat shape of 1 mm square was obtained in the manner similar to the first embodiment. Thereafter, as shown in FIG. 10, a pair of polarizing elements 2 each of which comprises a quadrilateral flat glass of 1 mm square were coupled to the Faraday rotator 1 so that the polarizing elements have planes of polarization of an angle of 45° Specifically, one of the polarizing elements 2 was arranged on a light-input side to serve as a polarizer while the other polarizing element 2 was arranged on a light-output side to serve as an analyzer. The Faraday rotator 1 and the polarizing elements 2 may collectively be called optical elements. Thus, an optical element assembly 10 comprising a combination of the optical elements was obtained. The optical element assembly 10 was received at the center of an inner bore or a cavity of a Cunife magnet 15 having a cylindrical shape and serving as both of a field-application magnet and an isolator casing. The Cunife magnet 15 had an outer diameter of 2 mm, an inner diameter of 1.5 mm, and a length of 2 mm. Thereafter, by the use of an electromagnet, a magnetic field of about 3 kOe was applied to magnetize the Cunife magnet 15 in a length direction. Thus, the optical isolator of the seventh embodiment was obtained.

Herein, the Cunife magnet 15 had an alloy composition of 58Cu—20Ni—20Fe—2Co. As regards magnet characteristics, the residual magnetization Br was approximately equal to 6000 (G), the coercive force Hc was approximately equal to 700 (Oe), and the maximum energy product $(BH)_{max}$ was approximately equal to 2.5 (MGOe).

The optical isolator of the seventh embodiment was measured for the isolator characteristics at the wavelength of 1.55 μm. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

8th Embodiment

Figure 11:
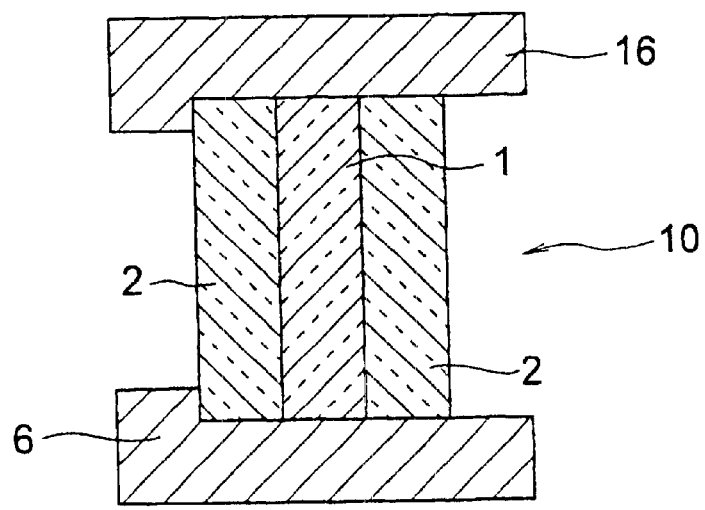
FIG. 11 is a side sectional view of an optical isolator according to an eighth embodiment of this invention.

An optical isolator according to an eighth embodiment was produced as follows. At first, the optical element assembly 10 was obtained in the manner similar to the seventh embodiment. Thereafter, the optical element assembly 10 was received in an inner bore or a cavity of a Cunife magnet 16 having a cylindrical shape and serving as a field-application magnet and an isolator casing. Referring to FIG. 11, the inner bore of the Cunife magnet 16 was slightly narrower (about 0.3 mm) at its one end than the remaining portion so that the optical element assembly 10 was easily positioned at the center of the inner bore. Thus, the optical isolator of the eighth embodiment was obtained.

Herein, the Cunife magnet 16 had an alloy composition of 60Cu—20Ni—20Fe. As regards magnet characteristics, the residual magnetization Br was approximately equal to 5000 (G), the coercive force Hc was approximately equal to 500 (Oe), and the maximum energy product $(BH)_{max}$ was approximately equal to 1.5 (MGOe).

The optical isolator of the eighth embodiment was measured for the isolator characteristics at the wavelength of 1.55 μm in the manner similar to the seventh embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

9th Embodiment

Figure 12:
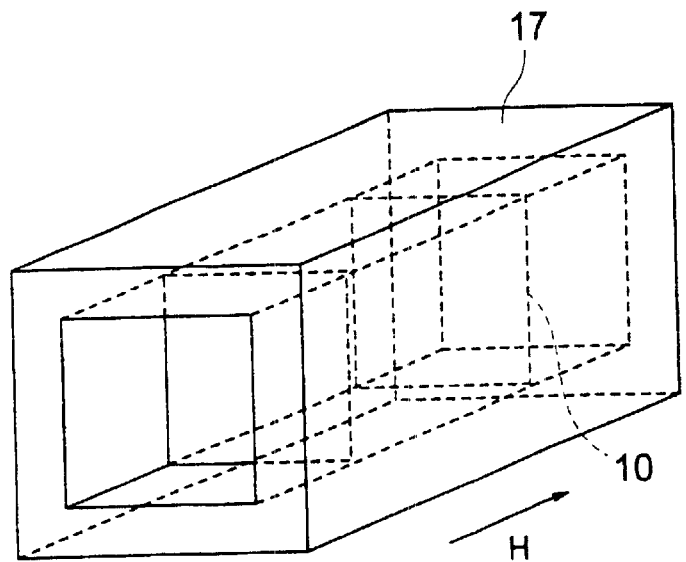
FIG. 12 is a perspective view of an optical isolator according to a ninth embodiment of this invention.

An optical isolator according to a ninth embodiment was produced as follows. At first, the optical element assembly 10 was obtained in the manner similar to the seventh embodiment. Thereafter, as illustrated in FIG. 12, the optical element assembly 10 was received at the center of a cavity of a Cunife magnet 17 having a rectangular-frame shape and serving as both of a field-application magnet and an isolator casing. The Cunife magnet 17 had an outer dimension of 1.5 mm (height)×1.5 mm (width)×2.5 mm (length) and has the cavity having an inner dimension of 1 mm (height)×1 mm (width)×2.5 mm (length). Thus, the optical isolator of the ninth embodiment was obtained.

Herein, the Cunife magnet 17 had an alloy composition of 58Cu—20Ni—20Fe—2 Mn. As regards magnet characteristics, the residual magnetization Br was about 5500 (G), the coercive force Hc was about 700 (Oe), and the maximum energy product $(BH)_{max}$ was about 2.5 (MGOe).

The optical isolator of the ninth embodiment was measured for the isolator characteristics at the wavelength of 1.55 μm in the manner similar to the seventh embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

10th Embodiment

Figure 13:
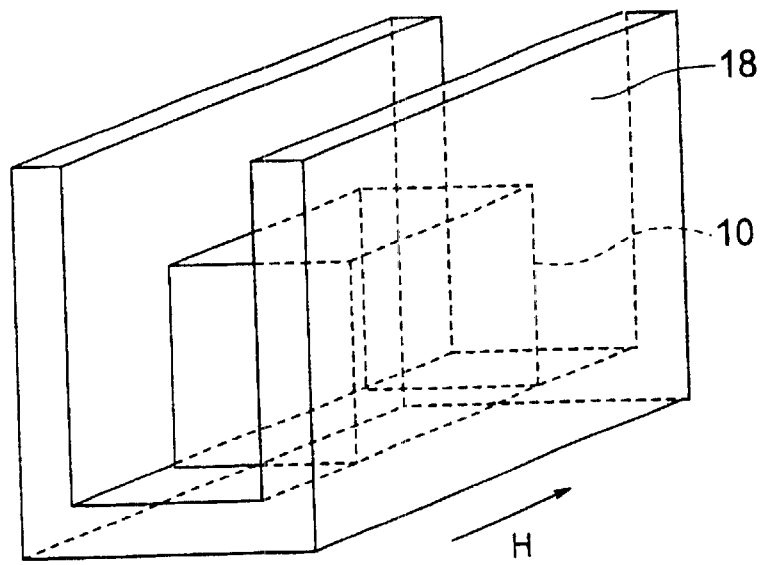
FIG. 13 is a perspective view of an optical isolator according to a tenth embodiment of this invention.

An optical isolator according to a tenth embodiment was produced as follows. At first, the optical element assembly 10 was obtained in the manner similar to the seventh embodiment. Thereafter, as illustrated in FIG. 13, the optical element assembly 10 was received at the center of a groove in a Cunife magnet 18 having a U-frame shape and serving as a field-application magnet and an isolator casing. The Cunife magnet 18 had an outer dimension of 2.0 mm (height)×1.5 mm (width)×3.0 mm (length) and has the groove having an inner dimension of 1.8 mm (height)×1.0 mm (width)×3.0 mm (length). Thus, the optical isolator of the tenth embodiment was obtained.

Herein, the Cunife magnet 18 had a composition and magnet characteristics similar to those of the Cunife magnet 15 used in the seventh embodiment.

The optical isolator of the tenth embodiment was measured for the isolator characteristics at the wavelength of 1.55 μm in the manner similar to the seventh embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

11th Embodiment

Figure 14:
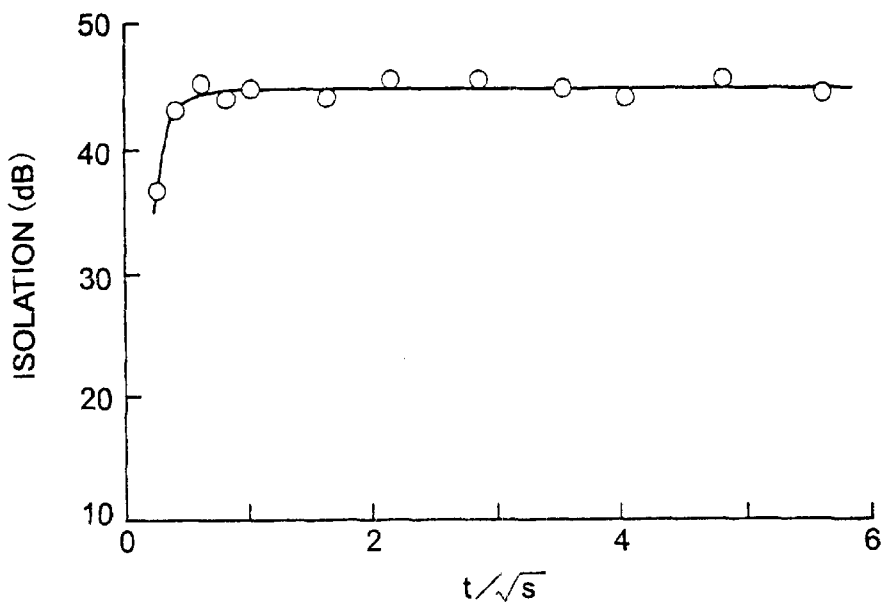
FIG. 14 is a graph showing an isolation characteristic of an optical isolator according to an eleventh embodiment of this invention.

As an eleventh embodiment, examination was made about the relationship between the isolation and the dimension of a magnet serving as a field-application magnet and an isolator casing. Preparation was made of a plurality of samples for each of the cylindrical Cunife magnet 15, the rectangular-frame Cunife magnet 17, and the U-frame Cunife magnet 18 used in the seventh, the ninth, and the tenth embodiments. Herein, the samples of the cylindrical magnet 15 had outer diameters between 2.0 mm and 4.0 mm, inner diameters between 1.3 mm and 3.0 mm, and lengths between 1.2 mm and 5.0 mm. The samples of the rectangular-frame and the U-frame magnets 17 and 18 had outer dimensions between 1.0 mm and 2.5 mm in height and width, inner dimensions between 0.8 mm and 2.0 mm in height and width, and lengths between 1.5 mm and 4.0 mm. Examination was made about the relationship between the isolation (dB) and the ratio $t \cdot (S)^{-\frac{1}{2}}$ where S represents a sectional area of the magnet in a plane perpendicular to the magnetizing direction H and t represents the length of the magnet in the magnetizing direction H. The results of examination are shown in FIG. 14. Herein, the optical element assembly 10 had an outer dimension between 0.7 mm and 1.5 mm in height and width.

In FIG. 14, the ratio $t \cdot (S)^{-\frac{1}{2}}$ has values of 0.2, 0.4, 0.6, 0.8, 1.0, 1.6, 2.1, 2.8, 3.5, 4.0, 4.8, and 5.6 at white circles in the figure. It will be understood that the isolation is remarkably improved when the ratio is equal to 0.4 or more. Therefore, it is effective that the ratio $t \cdot (S)^{-\frac{1}{2}}$ is not smaller than 0.4. Practically, the ratio $t \cdot (S)^{-\frac{1}{2}}$ has an upper limit of about 10.

12th Embodiment

As a twelfth embodiment, examination was made about the relationship between the isolation and the magnetic characteristics of a field-application magnet and a Faraday rotator. In the twelfth embodiment, use was made of samples of the cylindrical Cunife magnet 15, the rectangular-frame Cunife magnet 17, and the U-frame Cunife magnet 18 similar to those used in the eleventh embodiment. Specifically, examination was made about the relationship between the isolation (dB) and the ratio $Hm/4\pi Ms$ where Hm (Oe) represents the maximum magnetic field generated in the cavity of the magnet and $4\pi Ms$ (G) represents the saturation magnetization for the Bi garnet thick film used in the Faraday rotator 1 of the optical element assembly 10.

Figure 15:
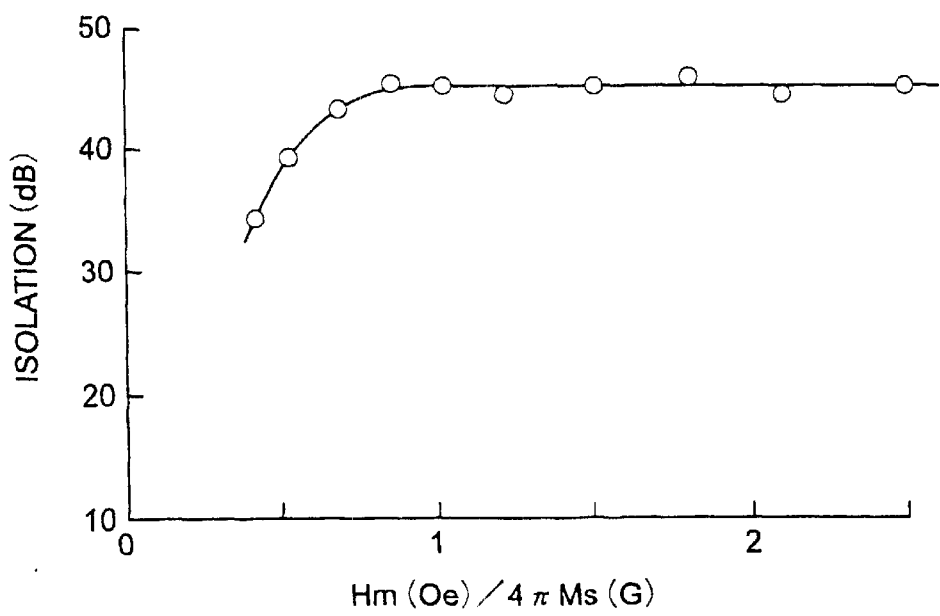
FIG. 15 is a graph showing an isolation characteristic of an optical isolator according to a twelfth embodiment of this invention.

The results of examination are shown in FIG. 15. Herein, the GdBi garnet film alone was used as the Bi garnet thick film of the Faraday rotator 1. By changing the melt composition, the saturation magnetization 4πMs (G) was adjusted between 30 and 500 (G) and the Faraday rotation at the wavelength of 1.55 μm was adjusted between 800 and 1200 (deg/cm). The ratio Hm/4πMs fell between 0.4 and 2.5.

From FIG. 15, it will be understood that the isolation is drastically improved when the ratio Hm/4πMs becomes equal to 0.7 or more. Therefore, it is effective that the ratio Hm/4πMs is not smaller than 0.7. If the TbBi garnet film or a combination of the GdBi garnet film and the TbBi garnet film is used as the Bi garnet film of the Faraday rotator 1, a substantially similar result can be obtained.

13th Embodiment

Figure 16:
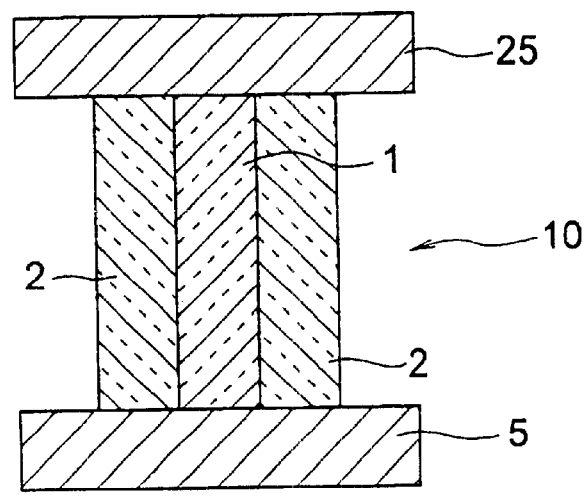
FIG. 16 is a side sectional view of an optical isolator according to a thirteenth embodiment of this invention.

An optical isolator according to a thirteenth embodiment was produced as follows. At first, a Faraday rotator 1 of a quadrilateral flat shape of 1 mm square was obtained in the manner similar to the first embodiment. Thereafter, as shown in FIG. 16, a pair of polarizing elements 2 each of which comprises a quadrilateral flat glass of 1 mm square were coupled to the Faraday rotator 1 so that those polarizing elements have planes of polarization of an angle of 45°. Specifically, one of the polarizing elements 2 was arranged on a light-input side to serve as a polarizer while the other polarizing element 2 was arranged on a light-output side to serve as an analyzer. The Faraday rotator 1 and the polarizing elements 2 may collectively be called optical elements. Thus, an optical element assembly 10 comprising a combination of the optical elements was obtained. The optical element assembly 10 was received at the center of an inner bore or a cavity of a platinum (Pt) alloy magnet 25 having a cylindrical shape and serving as a field-application magnet and an isolator casing. The Pt alloy magnet 25 was made of a Pt—Co alloy or a Pt—Fe alloy and had an outer diameter of 2 mm, an inner diameter of 1.5 mm, and a length of 2.5 mm. Thereafter, by the use of an electromagnet, a magnetic field of about 3 kOe was applied to magnetize the Pt alloy magnet 25 in a length direction. Thus, the optical isolator of the thirteenth embodiment was obtained.

The Pt alloy magnet 25 had an alloy composition of 50 at % Pt-50 at % Co. As regards magnet characteristics, the residual magnetization Br was approximately equal to 7000 (G), the coercive force $H_c$ was approximately equal to 5000 (Oe), and the maximum energy product $(BH)_{max}$ was approximately equal to 12 (MGOe).

The optical isolator of the thirteenth embodiment was measured for the isolator characteristics at the wavelength of 1.55 μm. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

14th Embodiment

Figure 17:
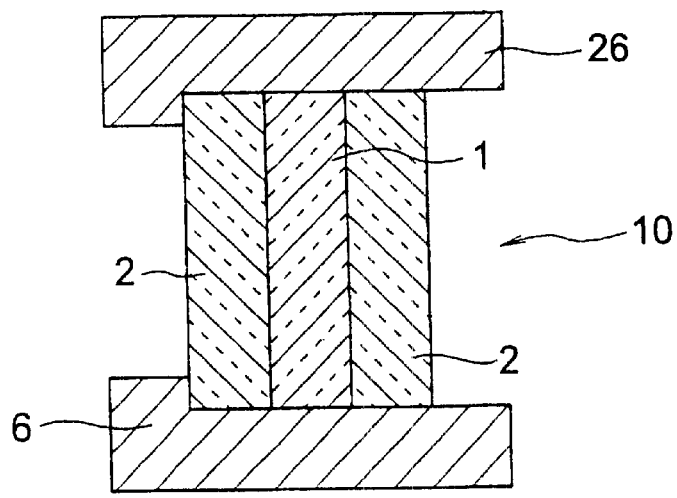
FIG. 17 is a side sectional view of an optical isolator according to a fourteenth embodiment of this invention.

An optical isolator according to a fourteenth embodiment was produced as follows. At first, the optical element assembly 10 was obtained in the manner similar to the thirteenth embodiment. Thereafter, the optical element assembly 10 was received in an inner bore or a cavity of a platinum (Pt) alloy magnet 26 having a cylindrical shape and serving as a field-application magnet and an isolator casing. Referring to FIG. 17, the inner bore of the Pt alloy magnet 26 was slightly narrower (about 0.3 mm) at its one end than the remaining portion so that the optical element assembly 10 was easily positioned at the center of the inner bore. Thus, the optical isolator of the fourteenth embodiment was obtained.

Herein, the Pt alloy magnet 26 had an alloy composition of 40at% Pt—59 at % Fe—1 at % Nb. As regards magnet characteristics, the residual magnetization Br was approximately equal to 9500 (G), the coercive force $H_c$ was approximately equal to 3500 (Oe), and the maximum energy product $(BH)_{max}$ was approximately equal to 15 (MGOe).

The optical isolator of the fourteenth embodiment was measured for the isolator characteristics at the wavelength of 1.55 μm in the manner similar to the thirteenth embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

15th Embodiment

Figure 18:
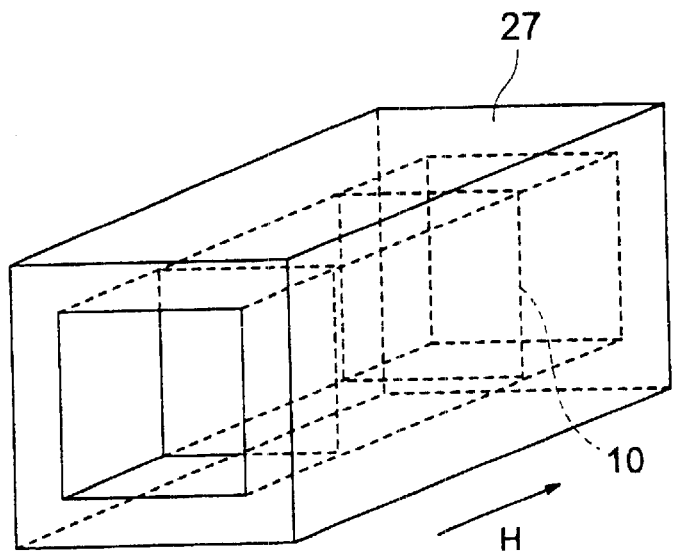
FIG. 18 is a perspective view of an optical isolator according to a fifteenth embodiment of this invention.

An optical isolator according to a fifteenth embodiment was produced as follows. At first, the optical element assembly 10 was obtained in the manner similar to the thirteenth embodiment. Thereafter, as illustrated in FIG. 18, the optical element assembly 10 was received at the center of a cavity of a platinum (Pt) alloy magnet 27 having a rectangular-frame shape and serving as a field-application magnet and an isolator casing. The Pt alloy magnet 27 had an outer dimension of 1.5 mm (height)×1.5 mm (width)×2.5 mm (length) and has the cavity having an inner dimension of 1 mm (height)×1 mm (width)×2.5 mm (length). Thus, the optical isolator of the fifteenth embodiment was obtained.

Herein, the Pt alloy magnet 27 had an alloy composition and magnet characteristics similar to those of the Pt alloy magnet 25 used in the thirteenth embodiment.

The optical isolator of the fifteenth embodiment was measured for the isolator characteristics at the wavelength of 1.55 μm in the manner similar to the thirteenth embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

16th Embodiment

Figure 19:
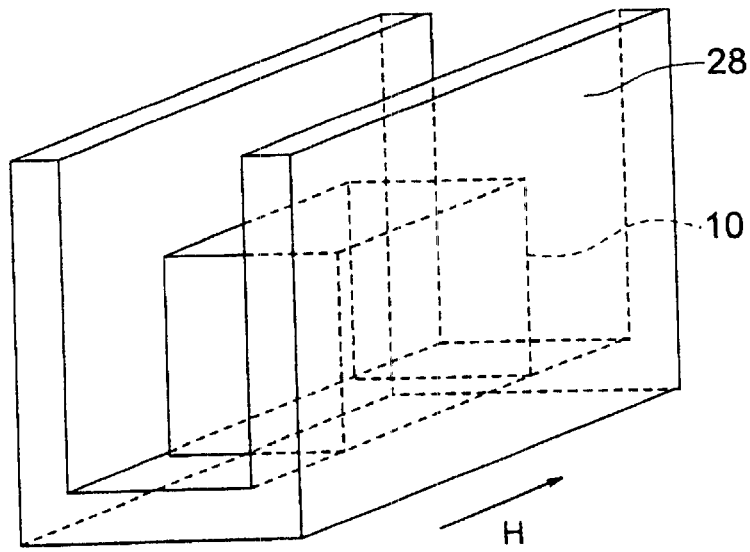
FIG. 19 is a perspective view of an optical isolator according to a sixteenth embodiment of this invention.

An optical isolator according to a sixteenth embodiment was produced as follows. At first, the optical element assembly 10 was obtained in the manner similar to the thirteenth embodiment. Thereafter, as illustrated in FIG. 19, the optical element assembly 10 was received at the center of a groove in a platinum (Pt) alloy magnet 28 having a U-frame shape and serving as a field-application magnet and an isolator casing. The Pt alloy magnet 28 had an outer dimension of 2.0 mm (height)×1.5 mm (width)×3.0 mm (length) and has the groove having an inner dimension of 1.8 mm (height) and 1.0 mm (width)×3.0 mm (length). Thus, the optical isolator of the sixteenth embodiment was obtained.

Herein, the Pt alloy magnet 28 had an alloy composition and magnet characteristics similar to those of the Pt alloy magnet 25 used in the thirteenth embodiment.

The optical isolator of the sixteenth embodiment was measured for the isolator characteristics at the wavelength of 1.55 μm in the manner similar to the thirteenth embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

17th Embodiment

Figure 20:
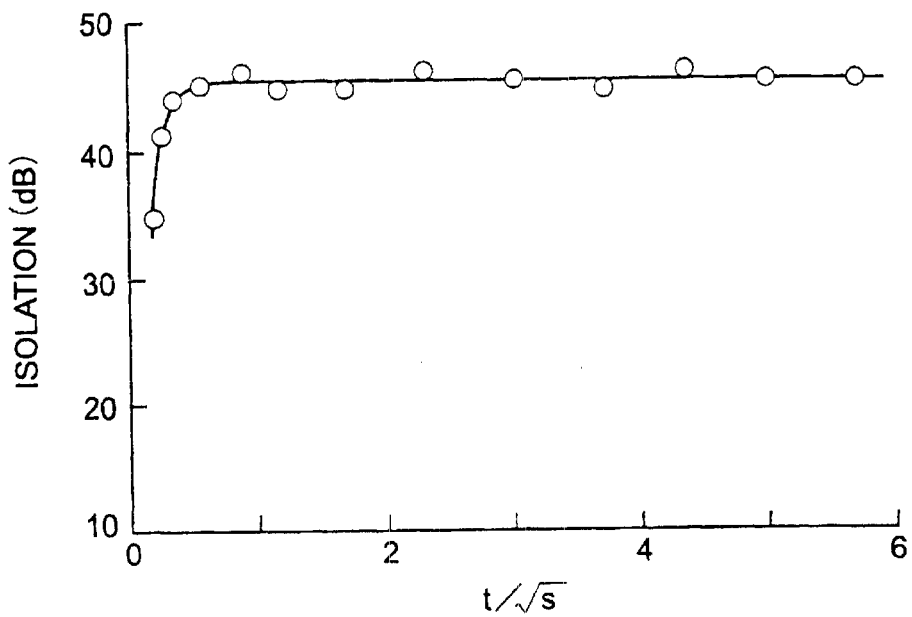
FIG. 20 is a graph showing an isolation characteristic of an optical isolator according to a seventeenth embodiment of this invention.

As a seventeenth embodiment, examination was made about the relationship between the isolation and the dimension of a magnet serving as a field-application magnet and an isolator casing. Preparation was made of a plurality of samples for each of the cylindrical Pt alloy magnet 25, the rectangular-frame Pt alloy magnet 27, and the U-frame Pt alloy magnet 28 used in the thirteenth, the fifteenth, and the sixteenth embodiments. Herein, the samples of the cylindrical magnet 25 had outer diameters between 2.0 mm and 4.0 mm, inner diameters between 1.3 mm and 3.0 mm, and lengths between 1.2 mm and 5.0 mm. The samples of the rectangular-frame and the U-frame magnets 27 and 28 had outer dimensions between 1.0 mm and 2.5 mm in height and width, inner dimensions between 0.8 mm and 2.0 mm in height and width, and lengths between 1.5 mm and 4.0 mm. Examination was made about the relationship between the isolation (dB) and the ratio $t \cdot (S)^{-\frac{1}{2}}$ where S represents a sectional area (bottom area) of the magnet in a plane perpendicular to the magnetizing direction H and t represents the length (depth or thickness) of the magnet in the magnetizing direction H. The results of examination are shown in FIG. 20. Herein, the optical element assembly 10 had an outer dimension between 0.7 mm and 1.5 mm in height and width.

In FIG. 20, the ratio $t \cdot (S)^{-\frac{1}{2}}$ has values of 0.2, 0.3, 0.4, 0.6, 0.9, 1.2, 1.7, 2.3, 3.0, 3.7, 4.3, 5.0, and 5.7 at white circles in the figure. It will be understood that the isolation is remarkably improved when the ratio is equal to 0.4 or more. Therefore, it is effective that the ratio $t \cdot (S)^{-\frac{1}{2}}$ is not smaller than 0.4. Practically, the ratio $t \cdot (S)^{-\frac{1}{2}}$ has an upper limit of about 10.

18th Embodiment

Figure 21:
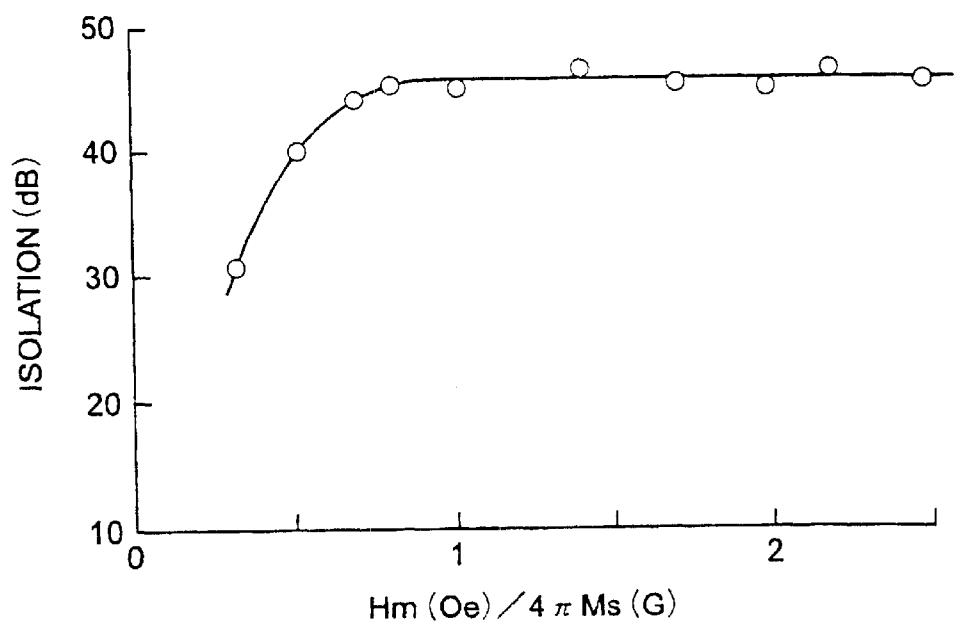
FIG. 21 is a graph showing an isolation characteristic of an optical isolator according to an eighteenth embodiment of this invention.

As an eighteenth embodiment, examination was made about the relationship between the isolation and the magnetic characteristics of a field-application magnet and a Faraday rotator. In the eighteenth embodiment, use was made of samples of the cylindrical Pt alloy magnet 25, the rectangular-frame Pt alloy magnet 27, and the U-frame Pt alloy magnet 28 similar to those used in the seventeenth embodiment. Specifically, examination was made about the relationship between the isolation (dB) and the ratio Hm/4πMs where Hm (Oe) represents the maximum magnetic field generated in the cavity of the magnet and 4πMs (G) represents the saturation magnetization for the Bi garnet thick film used in the Faraday rotator 1 of the optical element assembly 10. The results of examination are shown in FIG. 21. Herein, the GdBi garnet film alone was used as the Bi garnet thick film of the Faraday rotator 1. By changing the melt composition, the saturation magnetization 4πMs (G) was adjusted between 30 and 500 (G) and the Faraday rotation at the wavelength of 1.55 μm was adjusted between 800 and 1200 (deg/cm). The ratio Hm/4πMs fell between 0.4 and 2.5.

From FIG. 21, it will be understood that the isolation is drastically improved when the ratio Hm/4πMs becomes equal to 0.7 or more. Therefore, it is effective that the ratio Hm/4πMs is not smaller than 0.7. If the TbBi garnet film or a combination of the GdBi garnet film and the TbBi garnet film is used as the Bi garnet film of the Faraday rotator 1, a substantially similar result can be obtained.

19th Embodiment

Figure 22:
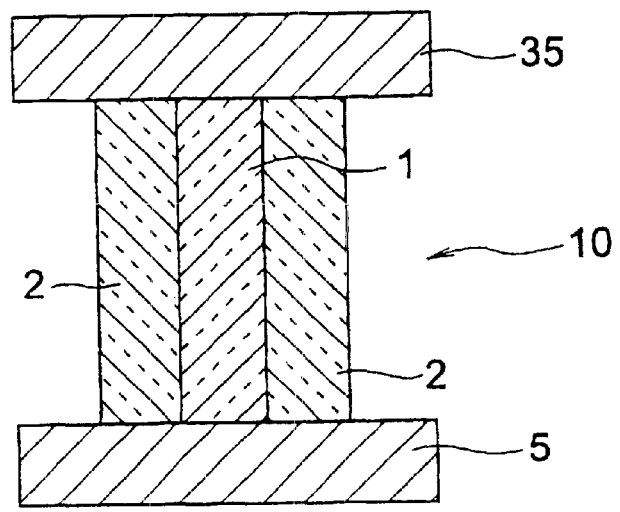
FIG. 22 is a side sectional view of an optical isolator according to a nineteenth embodiment of this invention.

An optical isolator according to a nineteenth embodiment was produced as follows. At first, a Faraday rotator 1 of a quadrilateral flat shape of 1 mm square was obtained in the manner similar to the first embodiment. Thereafter, as shown in FIG. 22, a pair of polarizing elements 2 each of which comprises a quadrilateral flat glass of 1 mm square were coupled to the Faraday rotator 1 so that those polarizing element have planes of polarization of 45°. Specifically, one of the polarizing elements 2 was arranged on a light-input side to serve as a polarizer while the other polarizing element 2 was arranged on a light-output side to serve as an analyzer. The Faraday rotator 1 and the polarizing elements 2 may collectively be called optical elements. Thus, an optical element assembly 10 comprising a combination of the optical elements was obtained. The optical element assembly 10 was received at the center of an inner bore or a cavity of a Cunico magnet 35 having a cylindrical shape and serving as a field-application magnet and an isolator casing. The Cunico magnet 35 had an outer diameter of 2 mm, an inner diameter of 1.5 mm, and a length of 2.5 mm. Thereafter, by the use of an electromagnet, a magnetic field of about 3 kOe was applied to magnetize the Cunico magnet 35 in a length direction. Thus, the optical isolator of the nineteenth embodiment was obtained.

Herein, the Cunico magnet 35 had an alloy composition of 50Cu—21Ni—29Co. As regards magnet characteristics, the residual magnetization Br was approximately equal to 3300 (G), the coercive force Hc was approximately equal to 0.8 (MGOe).

The optical isolator of the nineteenth embodiment was measured for the isolator characteristics at the wavelength of 1.55 μm. As a result, the optical isolator exhibited excellent characteristics, i.e., the isolation of about 45 dB and insertion loss of about 0.2 dB without any difference depending upon the kind of the Bi garnet thick film (the GdBi garnet film and the TbBi garnet film) of the Faraday rotator 1.

20th Embodiment

Figure 23:
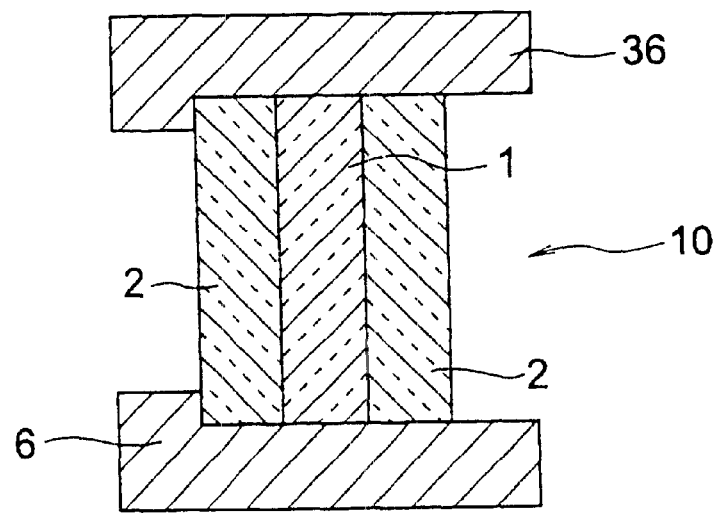
FIG. 23 is a side sectional view of an optical isolator according to a twentieth embodiment of this invention.

An optical isolator according to a twentieth embodiment was produced as follows. At first, the optical element assembly 10 was obtained in the manner similar to the nineteenth embodiment. Thereafter, the optical element assembly 10 was received in an inner bore or a cavity of a Cunico magnet 36 having a cylindrical shape and serving as a field-application magnet and an isolator casing. Referring to FIG. 23, the inner bore of the Cunico magnet 36 was slightly narrower (about 0.3 mm) at its one end than the remaining portion so that the optical element assembly 10 was easily positioned at the center of the inner bore. Thus, the optical isolator of the twentieth embodiment was obtained.

Herein, the Cunico magnet 36 had an alloy composition of 35Cu—24Ni—41Co. As regards magnet characteristics, the residual magnetization Br was approximately equal to 5000 (G), the coercive force Hc was approximately equal to 400 (Oe), and the maximum energy product $(BH)_{max}$ was approximately equal to 1.0 (MGOe).

The optical isolator of the twentieth embodiment was measured for the isolator characteristics at the wavelength of 1.55 μm in the manner similar to the nineteenth embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

21st Embodiment

Figure 24:
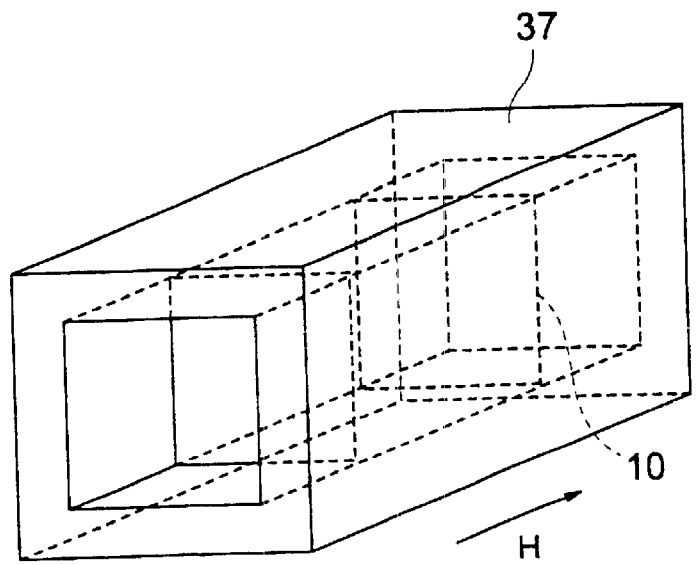
FIG. 24 is a perspective view of an optical isolator according to a twenty-first embodiment of this invention.

An optical isolator according to a twenty-first embodiment was produced as follows. At first, the optical element assembly 10 was obtained in the manner similar to the nineteenth embodiment. Thereafter, as illustrated in FIG. 24, the optical element assembly 10 was received at the center of a cavity of a Cunico magnet 37 having a rectangular-frame shape and serving as a field-application magnet and an isolator casing. The Cunico magnet 37 had an outer dimension of 1.5 mm (height)×1.5 mm (width)×2.5 mm (length) and has the cavity having an inner dimension of 1 mm (height)×1 mm (width)×2.5 mm (length). Thus, the optical isolator of the twenty-first embodiment was obtained.

Herein, the Cunico magnet 37 had an alloy composition and magnet characteristics similar to those of the Cunico magnet 35 used in the nineteenth embodiment.

The optical isolator of the twenty-first embodiment was measured for the isolator characteristics at the wavelength of 1.55 μm in the manner similar to the nineteenth embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

22nd Embodiment

Figure 25:
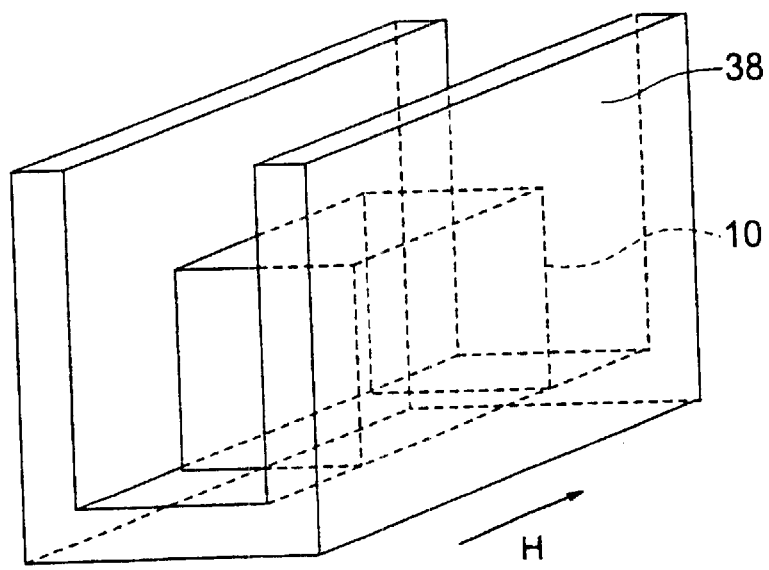
FIG. 25 is a perspective view of an optical isolator according to a twenty-second embodiment of this invention.

An optical isolator according to a twenty-second embodiment was produced as follows. At first, the optical element assembly 10 was obtained in the manner similar to the nineteenth embodiment. Thereafter, as illustrated in FIG. 25, the optical element assembly 10 was received at the center of a groove in a Cunico magnet 38 having a U-frame shape and serving as a field-application magnet and an isolator casing. The Cunico magnet 38 had an outer dimension of 2.0 mm (height)×1.5 mm (width)×3.0 mm (length) and has the groove having an inner dimension of 1.8 mm (height)×1.0 mm (width)×3.0 mm (length). Thus, the optical isolator of the twenty-second embodiment was obtained.

Herein, the Cunico magnet 38 had a composition and magnet characteristics similar to those of the Cunico magnet 35 used in the nineteenth embodiment.

The optical isolator of the twenty-second embodiment was measured for the isolator characteristics at the wavelength of 1.55 μm in the manner similar to the nineteenth embodiment. As a result, the optical isolator exhibited excellent characteristics, i.e., the isolation of about 45 dB and the insertion loss of about 0.2 dB without any difference depending upon the kind of the Bi garnet thick film (the GdBi garnet film and the TbBi garnet film) of the Faraday rotator 1.

23rd Embodiment

As a twenty-third embodiment, examination was made about the relationship between the isolation and the dimension of a magnet serving as a field-application magnet and an isolator casing. Preparation was made of a plurality of samples for each of the cylindrical Cunico magnet 35, the rectangular-frame Cunico magnet 37, and the U-frame Cunico magnet 38 used in the nineteenth, the twenty-first, and the twenty-second embodiments. Herein, the samples of the cylindrical magnet 35 had outer diameters between 2.0 mm and 4.0 mm, inner diameters between 1.3 mm and 3.0 mm, and lengths between 1.2 mm and 5.0 mm. The samples of the rectangular-frame and the U-frame magnets 37 and 38 had outer dimensions between 1.0 mm and 2.5 mm in height and width, inner dimensions between 0.8 mm and 2.0 mm in height and width, and lengths between 1.5 mm and 4.0 mm. Examination was made about the relationship between the isolation (dB) and the ratio $t \cdot (S)^{-\frac{1}{2}}$ where S represents a sectional area (bottom area) of the magnet in a plane perpendicular to the magnetizing direction H and t represents the length of the magnet in the magnetizing direction H. The results are shown in FIG. 26.

Herein, the optical element assembly 10 had an outer dimension between 0.7 mm and 1.5 mm in height and width.

Figure 26:
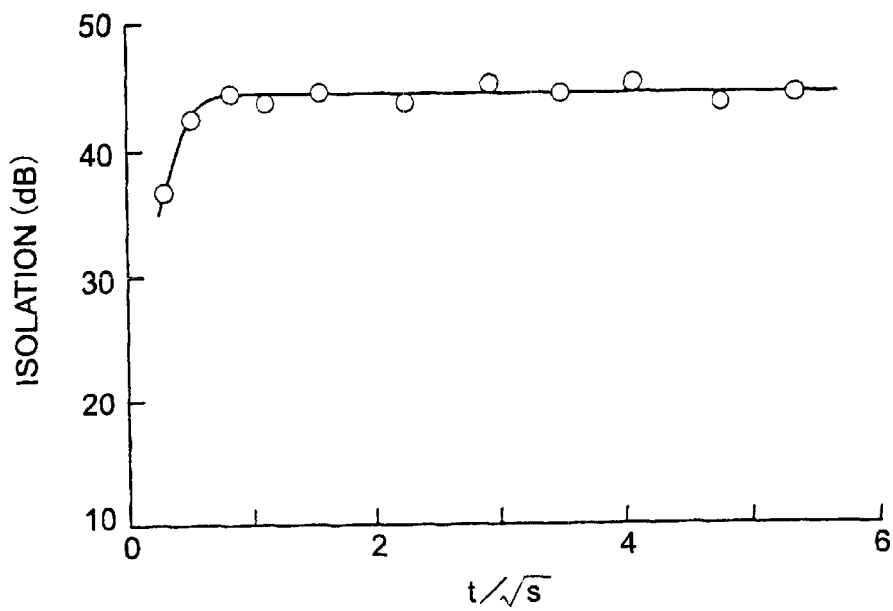
FIG. 26 is a graph showing an isolation characteristic of an optical isolator according to a twenty-third embodiment of this invention.

In FIG. 26, the ratio $t \cdot (S)^{-\frac{1}{2}}$ has values of 0.3, 0.5, 0.8, 1.1, 1.6, 2.3, 3.0, 3.6, 4.2, 4.9, and 5.5 at white circles in the figure. It will be understood that the isolation is remarkably improved when the ratio is equal to 0.5 or more. Therefore, it is effective that the ratio $t \cdot (S)^{-\frac{1}{2}}$ is not smaller than 0.5. Practically, the ratio $t \cdot (S)^{-\frac{1}{2}}$ has an upper limit of about 10.

24th Embodiment

Figure 27:
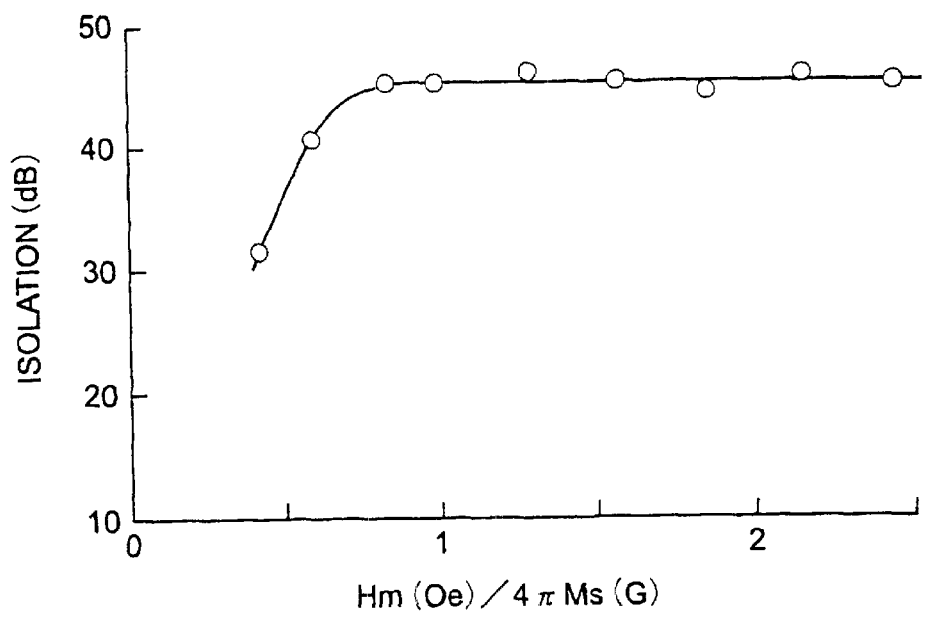
FIG. 27 is a graph showing an isolation characteristic of an optical isolator according to a twenty-fourth embodiment of this invention.

As a twenty-fourth embodiment, examination was made about the relationship between the isolation and the magnetic characteristics of a field-application magnet and a Faraday rotator. In the twenty-fourth embodiment, use was made of samples of the cylindrical Cunico magnet 35, the rectangular-frame Cunico magnet 37, and the U-frame Cunico magnet 38 similar to those used in the twenty-third embodiment. Specifically, examination was made about the relationship between the isolation (dB) and the ratio Hm/4πMs where Hm (Oe) represents the maximum magnetic field generated in the cavity of the magnet and 4πMs (G) represents the saturation magnetization for the Bi garnet thick film used in the Faraday rotator 1 of the optical element assembly 10. The results of examination are shown in FIG. 27. Herein, the GdBi garnet film alone was used as the Bi garnet thick film of the Faraday rotator 1. By changing the melt composition, the saturation magnetization 4πMs (G) was adjusted between 30 and 500 (G) and the Faraday rotation at the wavelength of 1.55 μm was adjusted between 800 and 1200 (deg/cm). The ratio Hm/4πMs fell between 0.4 and 2.5.

From FIG. 27, it will be understood that the isolation is drastically improved when the ratio Hm/4πMs becomes equal to 0.7 or more. Therefore, it is effective that the ratio Hm/4πMs is not smaller than 0.7. If the TbBi garnet film or a combination of the GdBi garnet film and the TbBi garnet film is used as the Bi garnet film of the Faraday rotator 1, a substantially similar result can be obtained.

Each of the Fe—Cr—Co magnet, the Cunife magnet, the Pt alloy magnet, and the Cunico magnet described above is easy in machining and high in residual flux density and therefore can be reduced in thickness. In addition, anticorrosion is excellent and welding is possible. Thus, these magnets are similar in characteristics to stainless steel excellent in mechanical characteristics and can therefore be used also as the isolator casing. It is consequently possible to minimize the optical isolator as small as about 0.5 mm.

On the other hand, if an existing permanent magnet such as a $Sm_2Co_{17}$ sintered magnet is used as the field-application magnet, the thickness obtained by machining must be equal to about 0.5 mm or more because this material is hard and brittle. On the other hand, in the cylindrical optical isolator described in each of the first, the second, the seventh, the eighth, the thirteenth, the fourteenth, the nineteenth, and the twenties embodiments, the outer diameter is smaller by about 1 mm or more than existing optical isolators. Furthermore, the $Sm_2Co_{17}$ magnet is not only high in material cost but also requires surface treatment such as plating because this magnet is easily oxidized. The above-mentioned requirements upon production results in an increase in cost of the existing optical isolators. In this invention, the optical isolator is considerably low in cost and small in size as compared with the existing optical isolators using the $Sm_2Co_{17}$ magnet. This is because the field-application magnet also serves as the isolator casing.

Being coupled to an optical fiber, the optical isolator can be applied to an optical waveguide, an optical device, an optical module, an optical system, and an optical component. In this event, since the optical fiber has an inner diameter of 0.25 mm and an outer diameter of 0.9 mm or more, it is possible to save the space in the optical waveguide, the optical device, the optical module, the optical system, and the optical component. In particular, in a structure including a number of optical isolators and fibers, the space saving effect is remarkable.

In the optical isolator of each embodiment, the polarizing elements 2 are not restricted to the glass but may be made of a birefringent material such as rutile and $YVO_4$. As far as the Faraday rotation of a garnet crystal is utilized, any material can be used. Each of the field-application isolator-casing magnets including the Fe—Cr—Co magnets 5 through 8 in the first through the fourth embodiments, the Cunife magnets 15 through 18 in the seventh through the tenth embodiments, the Pt alloy magnets 25 through 28 in the thirteenth through the sixteenth embodiments, and the Cunife magnets in the nineteenth through the twenty-second embodiments is not restricted to a single molded body illustrated in each of FIGS. 4 through 7, 10 through 13, 16 through 19, and 22 through 25 but may have a composite structure formed by a combination of a plurality of components.

The field-application isolator-casing magnet in the optical isolator according to each of the above-mentioned embodiments can also be used as a holder for holding the optical elements including the Faraday rotator 1 and the polarizing elements 2. Hereinafter, description will be made about specific examples.

25th Embodiment

Figure 28:
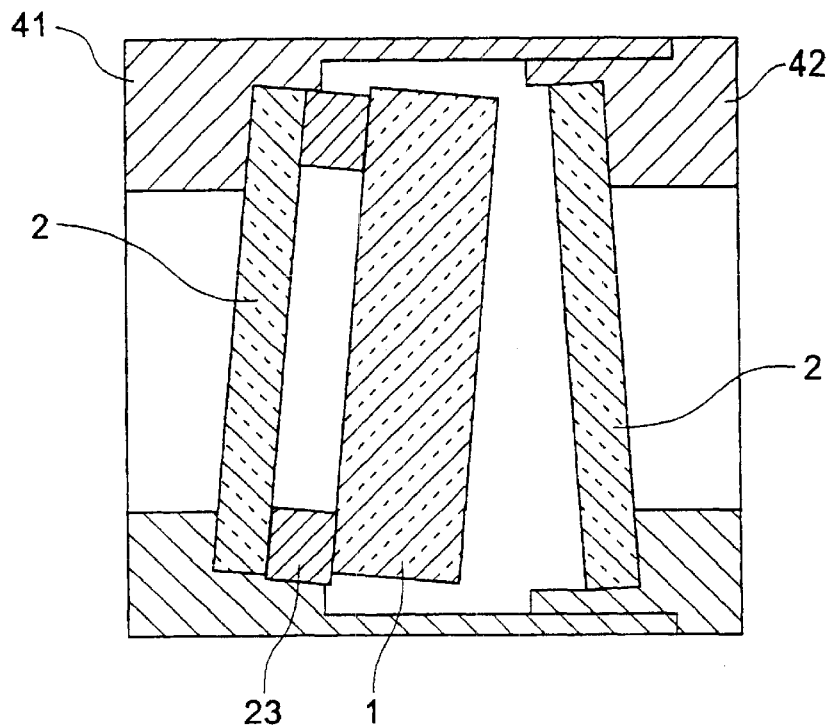
FIG. 28 is a side sectional view of a mounting structure of an optical isolator according to a twenty-fifth embodiment of this invention.

Referring to FIG. 28, an optical isolator according to a twenty-fifth embodiment of this invention is provided with an external holder 41 and an end holder 42 for holding a plurality of optical elements including a Faraday rotator 1 and two polarizing elements 2. Each of the external holder 41 and the end holder 42 is formed by an iron-chromium-cobalt (Fe—Cr—Co) magnet. The optical elements including the Faraday rotator 1 and the polarizing elements 2 are inclined so that a light beam is incident to their surfaces at an inclination angle of 10° or less in relation to the optical axis, and are fixed by an organic adhesive or a solder to the external holder 41 and the end holder 42.

Specifically, the external holder 41 of a generally cylindrical shape has a step-like recessed portion formed between an outer recessed portion and an inner recessed portion. One of the polarizing elements 2 and the Faraday rotator 1 with a metal ring 23 interposed therebetween are fixed by the organic adhesive or the solder to the step-like recessed portion. The end holder 42 of a generally cylindrical shape has a recessed portion. The other polarizing element 2 is fixed to the recessed portion of the end holder 42 by the organic adhesive or the solder. The external holder 41 and the end holder 42 are coupled to each other.

The mounting surface of the step-like recessed portion of the external holder 41 is inclined so that the one polarizing element 2 and the Faraday rotator 1 are inclined by an inclination angle of 10° or less with respect to a light beam incident along an optical axis of the optical isolator. Likewise, the mounting surface of the recessed portion formed in the end holder 42 is inclined so that the other polarizing element 2 is inclined at an inclination angle of 10° or less with respect to the light beam incident along the optical axis of the optical isolator.

In the optical isolator of the above-mentioned structure, the outer diameter φ is reduced as compared with the existing optical isolator using the Sm—Co magnet as the field-application magnet. Therefore, the production process is easy and the size and the cost can be reduced. As a result, the optical isolator of the twenty-fifth embodiment is reduced in forward loss and achieves a high isolation as compared with the existing optical isolator. In case where the optical isolator is attached to the end of a ferrule for holding an optical fiber and is incorporated into an optical component, it is possible to prevent occurrence of optical axis misalignment between the ferrule and the optical isolator. Table 1 shows the comparison between the optical isolator of the twenty-fifth embodiment and the existing optical isolator with respect to the optical characteristics and the occurrence of optical axis misalignment when applied to the optical component.

TABLE 1

| | OUTER DIAMETER (mm) | FORWARD LOSS (dB) | ISOLATION (dB) | OCCURRENCE OF OPTICAL AXIS MISALIGNMENT BETWEEN OPTICAL ISOLATOR AND FERRULE |
|---|---|---|---|---|
| OPTICAL ISOLATOR USING IRON-CHROMIUM-COBALT MAGNET | φ2 | 0.1–0.3 | 39–43 | 0% |
| EXISTING OPTICAL ISOLATOR | φ3 | 0.3–0.6 | 35–40 | 12% |

From Table 1, it is understood that the optical isolator of the twenty-fifth embodiment is smaller in size than the existing optical isolator and is considerably improved in optical characteristics and the occurrence of optical axis misalignment.

Table 2 shows the variation in optical characteristic (isolation) in response to the variation in inclination of the optical elements in the optical isolator in the twenty-fifth embodiment.

TABLE 2

| INCLINATION OF OPTICAL ELEMENTS | NO INCLINATION | INCLINATION AT AN ANGLE OF 10° OR LESS |
|---|---|---|
| ISOLATION | 35–37 dB | 40–43 dB |

From Table 2, it is understood that excellent isolation is achieved when the optical elements in the optical isolator are inclined at an inclination angle of 10° or less, as compared with the case where the optical elements are not inclined. However, the inclination of the optical elements at an inclination angle greater than 10° is unfavorable because the quenching ratio of the magnetic garnet thick film is degraded to deteriorate the isolation.

In the optical isolator of the twenty-fifth embodiment, each of the external holder 41 and the end holder 42 is formed by the Fe—Cr—Co magnet. However, instead of the Fe—Cr—Co magnet, use may be made of any one of the Cunife magnet, the Pt alloy magnet, and the Cunico magnet described above. In these cases, similar effect is obtained.

26th Embodiment

Figure 29:
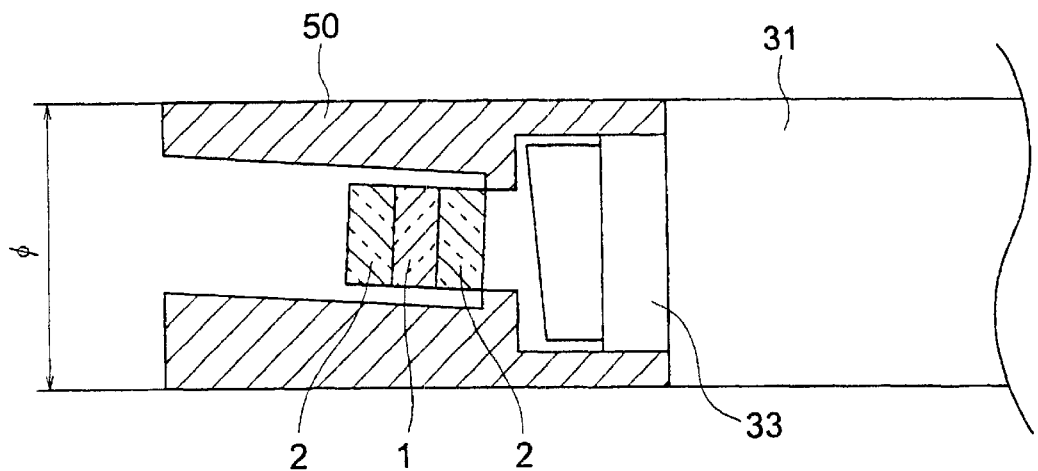
FIG. 29 is a side sectional view of an optical isolator according to a twenty-sixth embodiment of this invention which is incorporated into an optical component and attached to an end of a ferrule.

Referring to FIG. 29, an optical isolator according to a twenty-sixth embodiment of this invention is provided with a sleeve holder 50. The sleeve holder 50 has a sleeve integrally formed to connect a narrow ferrule 31 for holding an optical fiber 33, and is attached to the end of the ferrule 31. Thus, the sleeve holder 50 not only holds the optical elements but also connects the ferrule 31. A combination of the optical isolator with the sleeve holder 50 and the ferrule 31 forms an optical component.

Specifically, the optical elements including the Faraday rotator 1 and the two polarizing elements 2 on both sides thereof are arranged in a cavity formed inside of the sleeve holder 50 so that their surfaces are inclined with respect to a plane perpendicular to an optical axis of the optical isolator. In an opening of the sleeve holder 50 on the side opposite to the optical elements, a core portion of the optical fiber 33 held by the ferrule 31 is arranged to face the optical elements.

In case of the optical component described above, the sleeve holder 50 is made of the Fe—Cr—Co magnet which is strong in magnetic characteristics. Therefore, the step of mounting a different or separate permanent magnet as the field-application magnet is no longer required. Therefore, the outer diameter φ of the sleeve holder 50 is approximately equal to ⅔ of the outer diameter of the existing optical component illustrated in FIG. 3. Thus, the outer dimension of the optical component can further be reduced according to this invention. In the existing optical component, the magnetic garnet thick film of the Faraday rotator 1 is not inserted to the center of the permanent magnet 3 in the optical axis direction, as illustrated in FIG. 2. On the other hand, in the optical component of the twenty-sixth embodiment, the magnetic garnet thick film of the Faraday rotator 1 can be completely surrounded by the sleeve holder 50 comprising the Fe—Cr—Co magnet. Therefore, it is possible to apply a stable magnetic field to the magnetic garnet thick film of the Faraday rotator 1. Furthermore, since the junction between the optical isolator and the ferrule 31 is integral with the optical isolator, the number of parts and the number of the production steps can be reduced. In addition, it is possible to prevent the optical axis misalignment between the optical isolator and the ferrule 31 upon bonding.

In the optical component of the twenty-fifth embodiment, the sleeve holder 50 comprises the Fe—Cr—Co magnet. However, instead of the Fe—Cr—Co magnet, use may be made of any one of the Cunife magnet, the Pt alloy magnet, and the Cunico magnet described above. In these cases, similar effect is achieved.

Industrial Applicability

In any event, in the optical isolator of this invention, the magnetic garnet thick film used in the Faraday rotator 1 is a Bi garnet thick film which has a remarkably low saturation magnetization as compared with the rare-earth garnet. The field-application magnet for generating a magnetic field applied to magnetize the Bi garnet thick film comprises a selected one of the Fe—Cr—Co magnet, the Cunife magnet, the Pt alloy magnet, and the Cunico magnet which are easy in working such as deforming and machining, excellent in anticorrosion, and easy in application of magnetic anisotropy so that the performance is readily be improved. In addition, the field-application magnet is also used as the isolator casing. Thus, as compared with the existing optical isolator using the rare-earth magnet as the field-application magnet, the optical isolator of this invention can be produced at a considerably low cost and in a small size. As a consequence, if the above-mentioned optical isolator is incorporated into the optical waveguide, the optical device, the optical module, the optical system, and the optical component connected to the optical fiber, the space can be remarkably saved.

What is claimed is:

1. An optical isolator including a Faraday rotator of a magnetic garnet thick film and a field-application magnet for generating a magnetic field applied to magnetize said magnetic garnet thick film, wherein said field-application magnet is selected from the group consisting of an iron-chromium-cobalt (Fe—Cr—Co) magnet, a Cunife magnet made of a copper-nickel-iron (Cu—Ni—Fe) alloy, a platinum (Pt) alloy magnet made of a Pt—Co alloy or a Pt—Fe alloy, and a Cunico magnet made of a copper-nickel-cobalt (Cu—Ni—Co) alloy, wherein said field-application magnet has a U-frame shape and a dimension such that the relationship $t \cdot (S)^{-1/2} \geq 0.7$ is satisfied where S represents a sectional area of said magnet in a plane perpendicular to a magnetized direction thereof and t represents the length of said magnet in the magnetizing direction.

2. An optical isolator including a Faraday rotator of a magnetic garnet thick film and a field-application magnet for generating a magnetic field applied to magnetize said magnetic garnet thick film, wherein said field-application magnet is selected from the group consisting of an iron-chromium-cobalt (Fe—Cr—Co) magnet, a Cunife magnet made of a copper-nickel-iron (Cu—Ni—Fe) alloy, a platinum (Pt) alloy magnet made of a Pt—Co alloy or a Pt—Fe alloy, and a Cunico magnet made of a copper-nickel-cobalt (Cu—Ni—Co) alloy, wherein said field-application magnet has a rectangular-frame shape and a dimension such that the relationship $t \cdot (S)^{-1/2} \geq 0.7$ is satisfied where S represents a sectional area of said magnet in a plane perpendicular to a magnetized direction thereof and t represents the length of said magnet in the magnetizing direction.

3. An optical isolator as claimed in claim 2, wherein one of said Fe—Cr—Co magnet, said Cunife magnet, said Pt alloy magnet, and said Cunico magnet is used as an isolator casing.

4. An optical isolator including a Faraday rotator of a magnetic garnet thick film and a field-application magnet for generating a magnetic field applied to magnetize said magnetic garnet thick film, wherein said field-application magnet is selected from the group consisting of an iron-chromium-cobalt (Fe—Cr—Co) magnet, a Cunife magnet made of a copper-nickel-iron (Cu—Ni—Fe) alloy, a platinum (Pt) alloy magnet made of a Pt—Co alloy or a Pt—Fe alloy, and a Cunico magnet made of a copper-nickel-cobalt (Cu—Ni—Co) alloy, wherein said field-application magnet has a cylindrical shape and a dimension such that the relationship $t \cdot (S)^{-1/2} \geq 0.7$ is satisfied where S represents a sectional area of said magnet in a plane perpendicular to a magnetized direction thereof and t represents the length of said magnet in the magnetizing direction.

5. An optical isolator as claimed in claim 4, wherein one of said Fe—Cr—Co magnet, said Cunife magnet, said Pt alloy magnet, and said Cunico magnet is used as an isolator casing.

6. An optical isolator as claimed in claim 4, 2, or 1, wherein said magnetic garnet thick film is a Bi garnet thick film which is formed by at least one of a GdBi garnet film and a TbBi garnet film prepared by liquid-phase epitaxial growth.

7. An optical isolator as claimed in claim 6, wherein said field-application magnet which is one of said Fe—Cr—Co magnet, said Cunife magnet, said Pt alloy magnet, and said Cunico magnet satisfies the relationship $Hm/4\pi Ms \geq 0.7$ where Hm (Oe) represents the maximum magnetic field generated in a cavity of said magnet and $4\pi Ms$ (G) represents the saturation magnetization for said Bi garnet thick film.

8. An optical isolator as claimed in claim 7, wherein the isolator casing made of one of said Fe—Cr—Co magnet, said Cunife magnet, said Pt alloy magnet, and said Cunico magnet is used as a holder for holding a plurality of optical elements including said Faraday rotator and a pair of polarizing elements, said optical elements being fixed by an organic adhesive to said holder in an inclined position such that a light beam is incident to their surfaces at an inclination angle not greater than 10°.

9. An optical isolator as claimed in claim 8, wherein said holder formed by said isolator casing has a sleeve integrally formed therewith to connect a ferrule for holding an optical fiber.

10. An optical component including the optical isolator as claimed in claim 7, wherein an optical isolator casing made of one of said Fe—Cr—Co magnet, said Cunife magnet, said Pt Alloy magnet, and said Cunico magnet is used as a holder for holding a plurality of optical elements; including said Faraday rotator and a pair of polarizing elements, said optical elements being fixed by solder to said holder in an inclined position such that a light beam is incident to their surfaces at an inclination angle not greater than 10°;

said holder formed by said isolator casing having a sleeve integrally formed therewith to connect a ferrule for holding an optical fiber and said optical isolator is attached to an end of said ferrule for holding an optical fiber.

11. An optical isolator as claimed in claim 7, wherein an isolator casing made of one of said Fe—Cr—Co magnet, said Cunife magnet, said Pt alloy magnet, and said Cunico magnet is used as a holder for holding a plurality of optical elements including said Faraday rotator and a pair of polarizing elements, said optical elements being fixed by a solder to said holder in an inclined position such that a light beam is incident to their surfaces at an inclination angle not greater than 10°.

12. An optical isolator as claimed in claim 4, 2 or 1 wherein said field-application magnet is said (Fe—Cr—Co) magnet.

13. An optical waveguide including an optical isolator claimed in claim 4, 2 or 1.

14. An optical device including an optical isolator claimed in claim 4, 2 or 1.

15. An optical module including an optical isolator claimed in claim 4, 2 or 1.

16. An optical system including an optical isolator claimed in claim 4, 2 or 1.

17. An optical component including an optical isolator claimed in claim 4, 2 or 1.

18. An optical isolator as claimed in claim 1, wherein one of said Fe—Cr—Co magnet, said Cunife magnet, said Pt alloy magnet, and said Cunico magnet is used as an isolator casing.

* * * * *